US012675521B2

(12) United States Patent
Lassance et al.

(10) Patent No.: US 12,675,521 B2
(45) Date of Patent: Jul. 7, 2026

(54) COMPOSITE CODE SPARSE AUTOENCODERS FOR APPROXIMATE NEIGHBOR SEARCH

(71) Applicant: NAVER CORPORATION, Seongnam-si (KR)

(72) Inventors: Carlos Lassance, Grenoble (FR); Stéphane Clinchant, Meylan (FR); Thibault Formal, Grenoble (FR)

(73) Assignee: NAVER CORPORATION, Seongnam-si (KR)

( * ) Notice: Subject to any disclaimer, the term of this patent is extended or adjusted under 35 U.S.C. 154(b) by 251 days.

(21) Appl. No.: 17/804,992

(22) Filed: Jun. 1, 2022

(65) Prior Publication Data

US 2023/0021996 A1 Jan. 26, 2023

Related U.S. Application Data

(60) Provisional application No. 63/220,300, filed on Jul. 9, 2021.

(51) Int. Cl.
| | |
|---|---|
| *G06F 16/00* | (2019.01) |
| *G06F 16/41* | (2019.01) |
| *G06F 16/435* | (2019.01) |
| *G06N 3/0455* | (2023.01) |
| *G06N 3/048* | (2023.01) |

(52) U.S. Cl.
CPC ............ *G06F 16/41* (2019.01); *G06F 16/435* (2019.01); *G06N 3/0455* (2023.01); *G06N 3/048* (2023.01)

(58) Field of Classification Search
CPC ...... G06F 16/435; G06F 16/41; G06F 16/901; G06F 16/906; G06N 3/0455; G06N 3/048; G06N 3/047; G06N 3/08; G06N 3/082; G06N 3/088

USPC ......................................................... 707/705
See application file for complete search history.

(56) References Cited

U.S. PATENT DOCUMENTS

| | | | |
|---|---|---|---|
| 10,832,139 B2 | 11/2020 | Yan et al. | |
| 10,970,629 B1 * | 4/2021 | Dirac ........................ | G06N 7/01 |
| 2018/0046900 A1 * | 2/2018 | Dally .................... | G06F 9/3001 |
| 2018/0285734 A1 | 10/2018 | Chen et al. | |
| 2019/0370254 A1 * | 12/2019 | Maxwell .............. | G06F 16/221 |
| 2021/0109958 A1 * | 4/2021 | Behtash ................ | G06F 18/214 |

(Continued)

FOREIGN PATENT DOCUMENTS

| | | | | |
|---|---|---|---|---|
| CN | 104166684 A | * | 11/2014 | ........... G06F 16/903 |
| WO | WO-2014123353 A1 | * | 8/2014 | ........ H03M 13/1102 |

OTHER PUBLICATIONS

Ge, et al., Optimized Product Quantization for Approximate Nearest Neighbor Search. IEEE 2013. [online] [retrieved Sep. 28, 2025]. Retrieved from the Internet <URL:https://ieeexplore.ieee.org/document/6619223> (Year: 2013).*

(Continued)

*Primary Examiner* — Syed H Hasan
(74) *Attorney, Agent, or Firm* — Greer, Burns & Crain, Ltd

(57) ABSTRACT

Information retrieval methods employ a neural network encoder configured to receive a dense representation and generate a composite code comprising C clusters of dimension L from the dense representation. An activation function is configured to generate a sparse composite code from the composite code. The sparse composite code comprises a binary representation. An index can be generated using the sparse composite code.

39 Claims, 6 Drawing Sheets

400

Encoding of a query

402

Dense embeddings
Vector of size d
(Example: d=7)

CCSA

{0,4,6}

Sparse embeddings
Vector of size D
(Example: D=9)

Retrieval of the encoded query

Search encoded query on index
{0,4,6}

Scoring
404

Threshold

Top k sort

406

408

| | |
|---|---|
| 0 | {Doc1, Doc3} |
| 1 | |
| 2 | |
| 3 | |
| 4 | {Doc3} |
| 5 | |
| 6 | {Doc3, Doc5} |
| 7 | |
| 8 | |

Index
List of lists of size D

| | |
|---|---|
| Doc1 | 1 |
| Doc2 | 0 |
| Doc3 | 3 |
| Doc4 | 0 |
| Doc5 | 1 |
| Doc6 | 0 |
| Doc7 | 0 |
| Doc8 | 0 |
| Doc9 | 0 |

Scoring vector
Vector of size N
(Example: N=9)

| | |
|---|---|
| Doc1 | 1 |
| Doc3 | 3 |
| Doc5 | 1 |

| | |
|---|---|
| Doc3 | 3 |

(56) References Cited

U.S. PATENT DOCUMENTS

| 2021/0351791 | A1* | 11/2021 | Lee | ..................... | H03M 13/251 |
| 2022/0114479 | A1* | 4/2022 | Zhao | ................... | G06N 3/0985 |
| 2022/0253435 | A1* | 8/2022 | Chen | ........................ | G06N 3/08 |

OTHER PUBLICATIONS

Shu, R., et al., "Compressing Word Embeddings via Deep Compositional Code Learning," International Conference on Learning 2018, Feb. 15, 2018, 13 pages.

Sobroza, M., et al., "Sparse associative memory based on contextual code learning for disambiguating word senses," published on arXiv:1911. 06415v1, Nov. 14, 2019, 6 pages.

Tu, Z., et al., "Approximate Nearest Neighbor Search and Lightweight Dense Vector Reranking in Multi-Stage Retrieval Architectures," ICTIR '20, Sep. 14-17, 2020, Virtual Event, Norway, pp. 97-100.

Vorhees, E. et al., "NIST Special Publication: SP 500-331," Proceedings of the Twenty-Eighth Text Retrieval Conference, TREC 2019, Gaithersburg, Maryland, USA, Nov. 13-15, 2019. NIST Special Publication, National Institute of Standards and Technology (NIST), vol. 1250, 10 pages.

Xiong, L., et al., "Approximate Nearest Neighbor Negative Contrastive Learning for Dense Text Tetrieval," published on arXiv:2007. 00808v2, Oct. 20, 2020, 16 pages.

Xiong, L., et al., "Approximate Nearest Neighbor Negative Contrastive Learning for Dense Text Retrieval," published on arXiv:2007. 00808v1, Jul. 1, 2020, 15 pages.

Xiong, L., et al., "Approximate Nearest Neighbor Negative Contrastive Learning for Dense Text Retrieval," International Conference on Learning Representations, 2021, 16 pages.

Yang, P., et al., "Anserini: Enabling the Use of Lucene for Information Retrieval Research," Proceedings of the 40th International ACM SIGIR Conference on Research and Development in Information Retrieval, Aug. 7-11, 2017, Tokyo, Japan, pp. 1253-1256.

Zamani, H., et al., "From Neural Re-Ranking to Neural Ranking: Learning a Sparse Representation for Inverted Indexing," CIKM'18, Oct. 22-26, 2018, Torino, Italy, pp. 497-506.

Zhao, T., et al., "SPARTA: Efficient Open-Domain Question Answering via Sparse Transformer Matching Retrieval," published on arXiv:2009.13013v1, Sep. 28, 2020, 11 pages.

Amati, G., et al., "Probabilistic Models of Information Retrieval Based on Measuring the Divergence from Randomness," ACM Transactions on Information Systems, vol. 20, No. 4, Oct. 2002, pp. 357-389.

Azad, H., et al., "Query Expansion Techniques for Information Retrieval: a Survey," Information Processing & Management 56, No. 5, Sep. 2019, pp. 1698-1735, published on arXiv:1708. 00247v2, Jun. 20, 2019.

Babenko, A., et al., "The Inverted Multi-Index," IEEE Transactions on Pattern Analysis and Machine Intelligence 37, No. 6, Jun. 2015, pp. 1247-1260.

Bai, Y., et al., "SparTerm: Learning Term-based Sparse Representation for Fast Text Retrieval," published on arXiv:2010.00768v1, Oct. 2, 2020, 8 pages.

Bajaj, P., et al., "MS MARCO: A Human Generated MAchine Reading Comprehension Dataset," published on arXiv:1611.09268, Oct. 31, 2018, 11 pages.

Baranchuk, D., et al., "Learning to Route in Similarity Graphs," published on arXiv:1905.10987v1, May 27, 2019, 10 pages.

Bengio, Y., et al., "Estimating or Propagating Gradients Through Stochastic Neurons for Conditional Computation," published on arXiv:1308.3432v1, Aug. 15, 2013, 12 pages.

Berger, A., et al., "Information Retrieval as Statistical Translation," ACM SIGIR Forum 51, No. 2, Jul. 2017, pp. 219-226.

Boytsov, L., "Efficient and Accurate Non-Metric k-NN Search with Applications to Text Matching," Ph.D. Dissertation, Carnegie Mellon University, School of Computer Science, CMU-LTI-18-006, 2018, 205 pages.

Boytsov, L., et al., "Flexible retrieval with NMSLIB and FlexNeuART," published on arXiv:2010.14848v2, Nov. 17, 2020, 12 pages.

Chatfield, K., et al., "Return of the Devil in the Details: Delving Deep into Convolutional Nets," published on arXiv:1405.3531v4, Nov. 5, 2014, 11 pages.

Craswell, N., et al., "Overview of the TREC 2019 Deep Learning Track," published on arXiv:2003.07820v2, Mar. 18, 2020, 22 pages.

Dai, Z., et al., "Context-Aware Sentence/Passage Term Importance Estimation For First Stage Retrieval," published on arXiv:1910. 10687v2, Nov. 26, 2019, 9 pages.

Devlin, J., et al., "BERT: Pre-training of Deep Bidirectional Transformers for Language Understanding," published on arXiv:1810. 04805v1, Oct. 11, 2018, 14 pages.

Ge, T., et al., "Optimized Product Quantization," IEEE Transactions on Pattern Analysis and Machine Intelligence 36, No. 4, Apr. 2014, pp. 744-755.

Guu, K., et al., "REALM: Retrieval-Augmented Language Model Pre-Training," published on arXiv:2002.08909v1, Feb. 10, 2020, 12 pages.

Harris, C., et al., "Array programming with NumPy," Nature, vol. 585, 6825, Sep. 17, 2020, pp. 357-362.

Hofstätter, S., et al., "Let's measure run time!," published on arXiv:1907.04614v1, Jul. 10, 2019, 5 pages.

Hofstätter, S., et al., "Improving Efficient Neural Ranking Models with Cross-Architecture Knowledge Distillation," published on arXiv:2010.02666v2, Jan. 22, 2021, 10 pages.

Joffe, S., et al., "Batch Normalization: Accelerating Deep Network Training by Reducing Internal Covariate Shift," International conference on machine learning, 2015, PMLR, pp. 448-456, downloaded from arXiv:1502.03167v3, Mar. 2, 2015, 11 pages.

Jain, H., et al., "SUBIC: A supervised, structured binary code for image search," published on arXiv:1708.02932v1, Aug. 9, 2017, 10 pages.

Jang, E., et al., "Categorical Reparameterization with Gumbel-Softmax," published on arXiv:1611.01144v5, Aug. 5, 2017, 13 pages.

Jégou, H., et al., "Product Quantization for Nearest Neighbor Search," IEEE Trans. Pattern Anal. Mach. Intell. vol. 33, No. 1, 2011, pp. 117-128.

Johnson, J., et al., "Billion-scale similarity search with GPUs," published on arXiv:1702.08734v1, Feb. 28, 2017, 12 pages.

Kalantidis, Y., et al., "Locally Optimized Product Quantization for Approximate Nearest Neighbor Search," 2014 IEEE Conference on Computer Vision and Pattern Recognition, Columbus, OH, USA: IEEE, 2014, pp. 2329-2336.

Khattab, O., et al., "ColBERT: Efficient and Effective Passage Search via Contextualized Late Interaction over BERT," Proceedings of the 43rd International ACM SIGIR Conference on Research and Development in Information Retrieval (SIGIR '20), Association for Computing Machinery, New York, NY, Jul. 25-30, 2020, pp. 39-48.

Kingma, D., et al., "Adam: A method for stochastic optimization," published on arXiv:1412.6980v9, Jan. 30, 2017, 15 pages.

Klein, B., et al., "End-To-End Supervised Product Quantization for Image Search and Retrieval," 2019 IEEE/CVF Conference on Computer Vision and Pattern Recognition, (CVPR), 2019, pp. 5041-5050.

Kurland, O., et al., "Corpus Structure, Language Models, and Ad Hoc Information Retrieval," SIGIR'04, Sheffeld, South Yorkshire, UK, Jul. 25-29, 2004, 8 pages.

Lam, S., et al., "Numba: A LLVM-based Python JIT Compiler," Proceedings of the Second Workshop on the LLVM Compiler Infrastructure in HPC, Nov. 15-20, 2015, pp. 1-6.

Lee, S., et al., "Partitioned Parallel Radix Sort," High Performance Computing, Lecture Notes in Computer Science, Berlin, Heidelberg: Springer Berlin Heidelberg, vol. 1940, pp. 2000, 160-171.

Li, H., "Learning to Rank for Information Retrieval and Natural Language Processing," Synthesis Lectures on Human Language Technologies 12, San Rafael, Calif., Morgan & Claypool, 2011, 94 pages.

Lin, S., et al., "Distilling Dense Representations for Ranking using Tightly-Coupled Teachers," published on arXiv:2010.11386v1, Oct. 22, 2020, 7 pages.

(56)                    References Cited

OTHER PUBLICATIONS

Macavaney, S., et al., "Efficient Document Re-Ranking for Transformers by Precomputing Term Representations," Proceedings of the 43rd International ACM SIGIR Conference on Research and Development in Information Retrieval, Virtual Event, China, Jul. 25-30, 2020, pp. 49-58.

Mackenzie, J., et al., "Efficiency Implications of Term Weighting for Passage Retrieval," Proceedings of the 43rd International ACM SIGIR Conference on Research and Development in Information Retrieval, Virtual Event, China, Jul. 25-30, 2020, pp. 1821-1824.

Maddison, C., et al., "A* Sampling," Proceedings of the 27th International Conference on Neural Information Processing Systems, vol. 2, 2014, pp. 3086-3094.

Malkov, Y., et al., "Efficient and Robust Approximate Nearest Neighbor Search Using Hierarchical Navigable Small World Graphs," IEEE Transactions on Pattern Analysis and Machine Intelligence 42, 2020, pp. 824-836.

Mallia, A., et al., "PISA: Performant Indexes and Search for Academia," Proceedings of the Open-Source IR Replicability Challenge, Paris, France, Jul. 21-25, 2019, 7 pages.

Medini, T., et al., "SOLAR: Sparse Orthogonal Learned and Random Embeddings," published on arXiv:2008.13225v1, Aug. 30, 2020, 14 pages.

Nogueira, R., et al., "Passage Re-Ranking With BERT," published on arXiv:1901.04085v5, Apr. 14, 2020, 5 pages.

Nogueira, R., et al., "From doc2query to docTTTTTquery," MS MARCO Passage Retrieval Task, 2019, 3 pages.

Nogueira, R., et al., "Document Expansion by Query Prediction," published on arXiv:1904.08375v2, Sep. 25, 2019, 7 pages.

Nogueira, R., et al., "Multi-Stage Document Ranking with BERT," published on arXiv:1910.14424v1, Oct. 31, 2019, 13 pages.

Paria, B., et al., "Minimizing FLOPs to Learn Efficient Sparse Representations," International Conference on Learning Representations, Sep. 25, 2019, 20 pages.

Paszke, A., et al., "PyTorch: An Imperative Style, High-Performance Deep Learning Library," 33rd Conference on Neural Information Processing Systems (NeurIPS.43), Vancouver, Canada, 2019, 12 pages.

Qu, Y., et al., "RocketQA: An Optimized Training Approach to Dense Passage Retrieval for Open-Domain Question Answering," Proceedings of the 2021 Conference of the North American Chapter of the Association for Computational Linguistics: Human Language Technologies, Jun. 6-11, 2021, pp. 5835-5847.

Raffel, C., et al., "Exploring the Limits of Transfer Learning with a Unified Text-to-Text Transformer," Journal of Machine Learning Research 21, 2020, pp. 1-67, published on arXiv:1910.10683v3, Jul. 28, 2020.

Reimers, N., et al., "Sentence-BERT: Sentence Embeddings using Siamese BERT-Networks," Proceedings of the 2019 Conference on Empirical Methods in Natural Language Processing. Association for Computational Linguistics, Nov. 3-7, 2019, pp. 3982-3992.

Robertson, S., et al., "The Probabilistic Relevance Framework: BM25 and Beyond," Foundations and Trends in Information Retrieval 3, No. 4, 2009, pp. 333-389.

Sanh, V., et al., "DistilBERT, a distilled version of BERT: smaller, faster, cheaper and lighter," published on arXiv:1910.01108v2, Oct. 16, 2019, 5 pages.

Office Action received in Korean Application No. 10-2022-0084314, dated Feb. 21, 2025, 16 pages.

Luan, Y, et al., "Sparse, Dense, and Attentional Representations for Text Retrieval," Transactions of the Association for Computational Linguistics, Apr. 2021, vol. 9, pp. 329-345.

Negri, M., et al., "Natural Representation of Composite Data With Replicated Autoencoders," published on arXiv:1909.13327v1, Sep. 29, 2019, 18 pages.

Zhang, T., et al., "Sparse Composite Quantization," Proceedings ofthe IEEE Conference on Computer Vision and Pattern Recognition (CVPR), 2015, pp. 4548-4556.

Written Decision on Registration received for Korean Application No. 10-2022-0084314, dated Oct. 30, 2025.

* cited by examiner

COMPOSITE CODE SPARSE AUTOENCODERS FOR APPROXIMATE NEIGHBOR SEARCH

PRIORITY CLAIM

The present application claims priority to and the benefit from U.S. Provisional Patent Application Ser. No. 63/220,300, filed Jul. 9, 2021, which application is incorporated in its entirety by reference herein.

FIELD

The present disclosure relates generally to machine learning, and more particularly to processor-based methods and systems for encoding document representations for improving efficiency of information retrieval.

BACKGROUND

In Information Retrieval (IR), a ranking pipeline is generally decomposed into two stages. A first stage focuses on retrieving a candidate set from an entire collection. A second stage re-ranks the candidate set by relying on more complex models.

For instance, many search engines rank documents using a retrieval stage that retrieves candidate documents by operating on efficient inverted indexes with probabilistic models based on the distribution of word frequencies. After filtering a reduced candidate set, a re-ranking stage employs more complex learning models, such as handcrafted features and neural ranking architectures.

One such probabilistic model used for retrieval is a bag-of-words model (BOW) such as the Okapi BM25 or BM25 model disclosed in S. Robertson, 2009, The Probabilistic Relevance Framework; BM25 and Beyond, Foundations and Trends in Information Retrieval 3, 4, 2009, 333-389. BM25 is a bag-of-words retrieval and ranking function used by search engines to rank documents in a set based on their relevance to a search query, generally based on the query terms appearing in the documents (best matching) regardless of proximity. Another traditional IR model is divergence from randomness (DFR), which is a family of IR methods based on normalizing term frequency based on specific term frequency distributions.

More recently, dense re-rankers such as Siamese-BERT (Bidirectional Encoder Representations from Transformers) models, e.g., as disclosed in Reimers et al., Sentence-BERT: Sentence Embeddings using Siamese BERT-Networks, In Proceedings of the 2019 Conference on Empirical Methods in Natural Language Processing. Association for Computational Linguistics, 2019, have been used to complement traditional bag-of-words models. The adoption of such dense retrieval models represents a significant shift in indexing strategies. While similarity search using dense vectors is a common practice in applications such as computer vision, their use has been less prevalent in textural information retrieval.

Other information retrieval systems such as question answering systems similarly operate in two general stages. Some question answering systems in the art rely on Siamese architectures to speed up the retrieval time for the first ranker. Recent question answering systems have used the Siamese-BERT architecture to complement a BM25 model.

However, reranking with Transformer-based language models such as BERT is computationally challenging and costly. Indexing and similarity search on dense vectors for a large document collection is very slow (has significant latency). It has been proposed to precompute some intermediate representations, or to design new architectures such as ColBERT (e.g., as disclosed in Khattab et al., ColBERT: Efficient and Effective Passage Search via Contextualized Late Interaction over BERT, In Proceedings of the 43$^{rd}$ International ACM SIGIR Conference on Research and Development in Information Retrieval (SIGIR '20), Association for Computing Machinery, New York, NY, 2020, 39-48), to reduce the computational cost.

Another proposed approach has been to adopt distillation and quantization methods for such large models to reduce the number of operations needed to answer a query. Other IR approaches require the use of labelled data.

Instead of exact search methods, approximate search methods such as Approximate Nearest Neighbor (ANN) search can be employed, with a slight degradation of performance. For example, some methods use optimized similarity search libraries such as FAISS (e.g., as disclosed in Johnson et al., Billion-scale search with GPUs, CoRR abs/1702.08734 (2017)). However, such methods tend to favor, for instance, Recall@10 instead of Recall@1000, and favor throughput (e.g., queries/second, with batch processing) versus latency (e.g., ms/query, with one-by-one processing).

SUMMARY

Provided herein, among other things, are methods and systems for creating an index for information retrieval, the method being implemented by a processor and memory, the method comprising:

(a) receiving a set of input data, wherein each element of data in the set is a dense representation;

(b) generating a composite code from the dense representation, the composite code comprising C clusters of dimension L;

(c) using an activation function to generate a sparse representation from the composite code, the sparse representation comprising a binary representation;

(d) repeating steps (a)-(c) for each element of data in the set of input data;

(e) creating an index based on each of the sparse representations generated at step (c) corresponding to each element of data in the set of input data; and (f) outputting the index for information retrieval.

Other embodiments provide, among other things, an autoencoder implemented by a processor and a memory. The autoencoder comprises a neural network encoder configured to receive a dense representation and generate a composite code comprising C clusters of dimension L from the dense representation. An activation function is configured to generate a sparse composite code from the composite code. The sparse composite code comprises a binary representation.

Other embodiments provide, among other things, an information retrieval architecture implemented by one or more processors in combination with a memory. An encoding phase is configured to receive a dense representation corresponding to a query, generate a composite code comprising C clusters of dimension L from the dense representation, and generate a sparse composite code from the composite code using an activation function. The sparse composite code comprises a binary representation. A scoring phase is configured to search an index based on the sparse composite code and output scores for a plurality of documents based on the index. A sorting phase is configured to rank a subset of the plurality of documents based on the scores.

According to a complementary aspect, the present disclosure provides a computer program product, comprising code instructions to execute a method according to the previously described aspects; and a computer-readable medium, on which is stored a computer program product comprising code instructions for executing a method according to the previously described embodiments and aspects. The present disclosure further provides a processor configured using code instructions for executing a method according to the previously described embodiments and aspects.

Other features and advantages of the invention will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings, wherein.

In the drawings, reference numbers may be reused to identify similar and/or identical elements.

DETAILED DESCRIPTION

Figure 1:
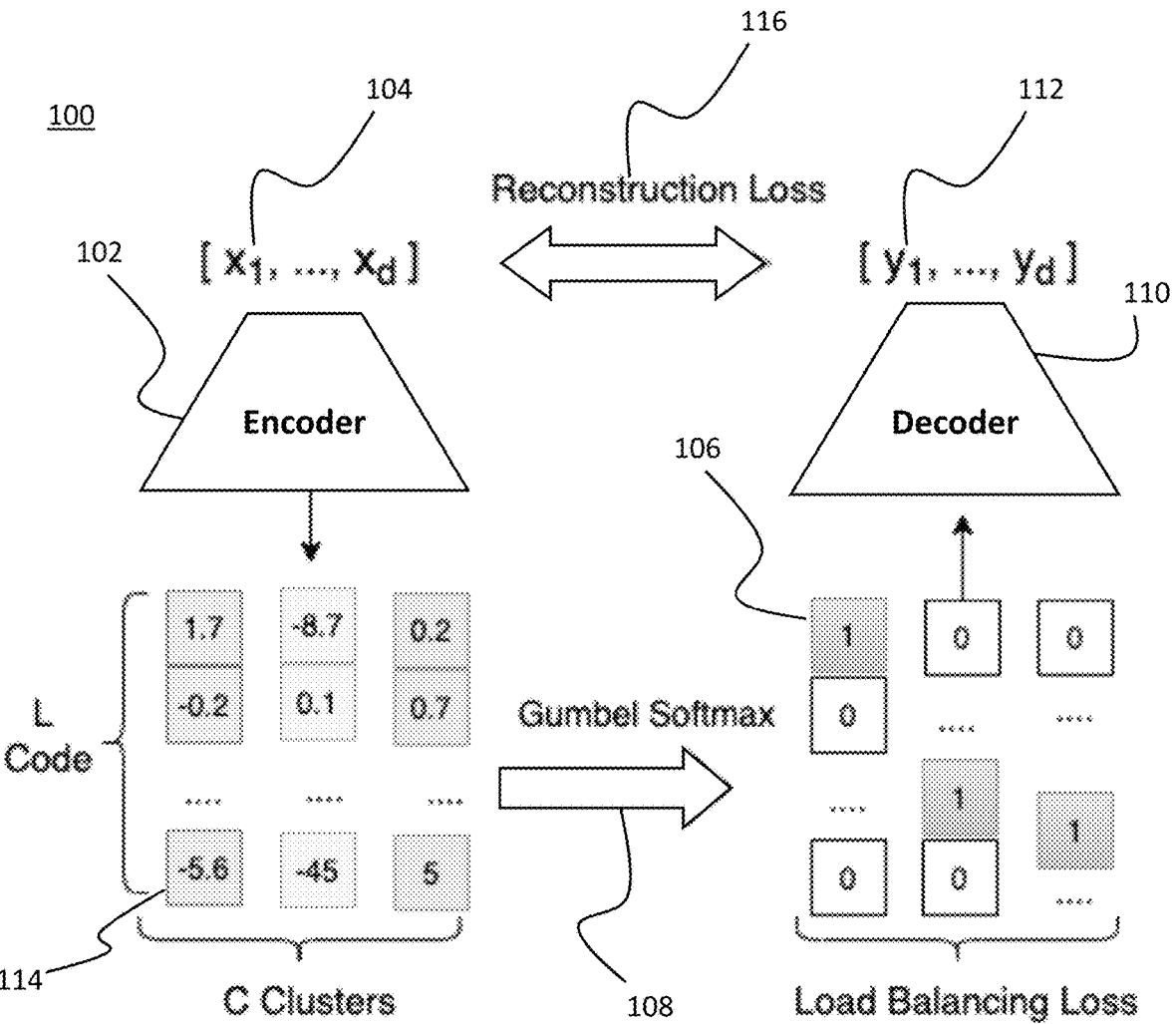
FIG. 1 shows an example architecture for a neural autoencoder provided by a Composite Code Sparse Autoencoders (CCSA) model according to example embodiments.

In information retrieval scenarios, latency negatively affects the user's experience to a significant degree. It is desirable to provide methods and systems for information retrieval (IR) that can improve efficiency, while minimizing tradeoffs in performance or recall.

Example embodiments provide, among other things, a Composite Code Sparse Autoencoder (CCSA)-based approach for information retrieval (IR). Example CCSA-based autoencoders and methods improve conventional IR systems by, for instance, improving a first, retrieval stage of an IR pipeline that retrieves a candidate set of information (e.g., documents, which herein generally refers to text documents, images, etc.) from an entire collection, while another, downstream stage re-ranks the candidate set.

An example CCSA-based architecture for IR incorporates a neural autoencoder (autoencoder) at a retrieval stage of an IR pipeline. The autoencoder receives dense document representations or embeddings (more generally, dense representations), e.g., from a Transformer-based model or any other source, and generates (e.g., learns) sparse document representations (sparse representations) that are indexable and can be used for more efficient or lower latency information retrieval, e.g., using Approximate Nearest Neighbor search (ANN) methods. In some example embodiments, the sparse representations are further used to generate an inverted index for further improvement to retrieval efficiency. "Dense" refers to having a larger number of non-zero elements in an array, while "sparse" refers to having a smaller number of non-zero elements (and a larger number of zero elements).

Known IR techniques such as bag-of-words (BOW) approaches use sparse representations for efficient information retrieval in the first stage, or use dense representations with exact search, which has very slow performance (high latency). Other known IR approaches require labeled data.

By contrast, example CCSA-based retrieval methods transform dense representations received from a model that has been finetuned on relevance data, e.g., a Transformer model such as but not limited to a pre-trained Siamese-BERT model, by compressing the dense representations into sparse codes that are efficient for indexing. Example CCSA-based methods can use preexisting dense representations of documents in a collection or use dense representations from other sources.

Example CCSA-based retrieval methods sparsify the dense representations by training an autoencoder that produces a binary representation embodied in composite codes. The composite codes can be embodied in a clustered binary representation, e.g., C clusters of dimension L, where each cluster sums to one.

Binary representations produced by example CCSA-based methods are fit for indexing, as they are naturally sparse and balanced. Example methods can treat each item in a batch directly with binary values, which allows for a more precise approximation of the overall index balance.

Example embodiments using composite codes as sparse representations for IR methods can greatly improve latency (e.g., time to respond to a search query or answer a question) compared to traditional IR methods, and can obtain significant efficiency improvements compared to retrieval using dense representations, while maintaining recall, with only a small retrieval (e.g., ranking) performance cost. Retrieval performance of example methods, for instance, can be comparable to approaches using a brute force (exact) nearest neighbor search on dense embeddings from a Siamese-BERT output, while providing significant latency reduction, especially with large document sets.

A first stage retriever having an autoencoder according to example embodiments can be fully deployed on one or more processors, with suitable latency and high throughput. In some example embodiments, efficiency can be further improved by implementing information retrieval methods using parallelization and/or by distributing information retrieval tasks among various processor types (e.g., CPUs and GPUs).

Further, since composite codes are naturally sparse, example CCSA-based methods can learn efficient parallel inverted indexes. A load-balancing regularizer may be provided to enforce load-balancing between different dimensions, so that each dimension is activated by a comparable number of documents and thus increases indexing efficiency.

Example binary representations may also be compatible with graph-based approximate nearest neighbor (ANN) search methods. In some example embodiments, CCSA-based methods are applied as a binary quantization of the dense embeddings and combined with, for instance, graph-based ANN techniques, to provide results that are competitive with approaches such as product quantization (PQ).

ANN methods are typically used in computer vision applications. For instance, Jegou et al., Product Quantization for Nearest Neighbor Search. IEEE Trans. Pattern Anal. Mach. Intell. 33, 1 (2011), 117-128, discloses using Product Quantization (PQ) to efficiently encode high dimensional vectors by partitioning each vector into chunks that are further quantized. Quantization in each local space is performed by k-means clustering. PQ embeddings can then be combined with other ANN techniques in order to improve the speed of retrieval, using methods such as inverted indexes or graph-based methods. When employed in information retrieval with graph-based ANN, example CCSA-based methods can greatly reduce retrieval latency, while increasing accuracy, at the cost of a slight memory overhead.

Example methods may combine CCSA with graph-based approaches such as Hierarchical Navigable Small World (HNSW)-based ANN techniques. HNSW, e.g., as disclosed in Malkov et al., Efficient and Robust Approximate Nearest Neighbor Search Using Hierarchical Navigable Small World Graphs, IEEE Transactions on Pattern Analysis and Machine Intelligence 42 (2020), 824-836, improves retrieval with a trade-off of a larger memory overhead. In HNSW, a multi-level graph is built at indexing time connecting similar elements. Retrieval is then performed by traversing the graph. To scale with larger datasets and reduce memory overhead, HNSW can be further combined with inverted indexing.

HNSW is a powerful ANN technique, which can construct a graph of objects at indexing, but conventionally has negatively impacted the memory and index sizes for large collection. Combining CCSA with HNSW in example methods mitigates such limitations. CCSA binary quantization can be beneficial for the index size and memory usage for graph-based HNSW methods, while maintaining a good level of recall and MRR.

Example IR schemes using sparse representations generated by example regularized autoencoders were shown in experiments to provide improved efficiency and ease of parallelization. Experiments evaluating example methods on datasets demonstrate their efficiency and reduced computational costs as compared to approximate (product quantization with inverted and graph-based indexes) as well as exact nearest neighbor search on dense embeddings.

Example benefits of CCSA-based methods include, but are not limited to, reducing the latency of queries while keeping suitable performance for search. Example search methods can use CPU-based and/or GPU-based retrieval that can also scale to many machines/processors. Example CCSA-based methods can be applied to any task where, for instance, an encoder can be provided for the relevant document and query and where nearest neighbor search can be used in a very large information collection.

Nonlimiting example applications include text ranking, search engines (text, image), image retrieval for computer vision, recommendation tasks, question answering, translation memories for neural machine translation (NMT), and others.

Example Architecture

FIG. 1 shows an example architecture for a neural autoencoder 100 provided by a Composite Code Sparse Autoencoders (CCSA) model according to example embodiments. The autoencoder 100 includes an encoder block 102 that encodes a dense embedding vector 104, which is received as an input. The encoder block 102 encodes the dense embedding vector 104 into a dense composite code 114 of C clusters, which is in turn encoded as a sparse vector 106 using an activation function 108.

A nonlimiting example dense embedding vector 104 or dense representation input may be a preexisting dense representation or a dense representation that is generated at runtime. The dense representation may be, for instance, a dense representation of a data element in a set of input data such as a document among a set of documents (e.g., a collection of documents) that are to be indexed for information retrieval. As another example, the dense representation may be a dense representation of a received query that will be used to search an index for information retrieval. As a nonlimiting example, the dense representation may be provided from a Transformer-based model (e.g., a language model or other model) processing the documents or the received query. However, it will be appreciated that the dense representation may be provided from any suitable source.

For training the autoencoder 100, including the encoder block 102 and the activation function 108, a decoder block 110 may be provided to decode the sparse vector 106 into a reconstructed dense embedding 112 that approximates the original dense embedding 104 subject to a reconstruction loss 116. The decoder block 110 may be omitted from the example autoencoder 100, for instance if the autoencoder is trained.

An example encoder 102 can be embodied, for instance, in a one-layer encoder, an example activation function 108 can be embodied, for instance, in a hard Gumbel softmax activation function (which may be, but need not be, provided in an activation layer), and an example decoder 110 can be embodied, for instance, in a linear decoder. However, it will be appreciated that the encoder 102, activation function 108, and/or decoder 110 can be embodied using other models, e.g., neural models.

In example methods, dense composite codes (e.g., dense composite code 114) are transformed to sparse composite codes (e.g., sparse vector 106) using an activation function (e.g., activation function 108). Composite codes may be defined, for instance, by a vector of dimension (size) D, where the vector is decomposed in C clusters of size L. In an example embodiment, the encoder 102, which may include one or more neural layers, performs a linear projection of the dense embedding vector 104 having dimension d (e.g., for a dense embedding vector $\{x_1, x_2, \ldots x_d\}$ each element can be a different dimension of the input data (vector x), and d can be the amount of dimensions of the input data) to a vector of dimension D and decomposes the projected vector into a dense composite code 114 of C clusters. For instance, a document (e.g., a sample text document, image, etc.) having d data elements (e.g., tokens in a text document, pixels in an image, etc.) may be represented by probabilities or proportions, represented by values, of each of L subconcepts or classifications for each of C concepts or clusters to provide a vector of dimension D.

Composite codes can be used to embed various types of input data. For instance, as disclosed in Shu et al., 2018 Compressing Word Embeddings via Deep Compositional Code Learning, In International Conference on Learning Representations, https://openreview.net/forum?id= BJRZz-FIRb, a composite code for a word may be a vector in $1, \ldots, L^C$. For example, given codebooks $E_1, \ldots, E_C$, and letting the vectors in codebook i be $E_i(1), \ldots, E_i(L)$, the embedding of a composite code with components $(c_1, \ldots, c_C)$ may be $$\text{sum}_{i=1}^{C} E_i(c_i).$$

As another example, an image having d pixels may be represented by C clusters having classifications for features that may appear in the image such as but not limited to {color of object, shape, . . . }, and for the classification "color of object" values for L subconcepts or classification possibilities such as but not limited to {blue, green, red, . . . }.

For improving indexing and/or information retrieval efficiency, the activation function 108 transforms the dense composite code 114 into the sparse composite code 106, e.g., a sparse embedding vector, of size D. An example operation of the activation function 108 is provided in further detail below. The sparse embedding vector 106 may additionally be transformed into or used to generate components of one or more posting lists to further improve efficiency of indexing and information retrieval.

To improve stability and reduce the variance in representations from the original dense inputs 104, the autoencoder 100 can further include a batch normalization (not shown) before the projection. Batch normalization helps to balance the index. An example batch normalization can be configured, e.g., such as disclosed in Joffe et al., Batch normalization: Accelerating deep network training by reducing internal covariate shift, In International conference on machine learning, 2015, PMLR, 448-456.

A load-balancing regularizer (not shown), an example of which is explained in more detail below, can be provided in the autoencoder architecture 100 to ensure that dimensions in the sparse composite codes are activated by a similar amount of documents. In example embodiments, the indexing may occur in the code space, as opposed to the reconstructed space.

To illustrate a model embodied in the example autoencoder 100 (including the decoder 110 for training), let N be the number of documents in the collection(s) and let $x_i$ be the dense representation of document i. The encoder can be noted by e(x), the Gumbel softmax activation by g(x), and the decoder by d(x), so that the full autoencoder function can be written as:

$$f(x) = d(g(e(x)))$$ (1)

For each cluster C in the sparse composite code only one over the L dimensions will be activated by the activation layer 108 with a value of one in an example method, thus generating a one-hot representation per cluster and a C-hot representation for the overall vector.

The example composite codes are easy to store, with only $C \log_2(L)$ bits needed to represent each passage. Further, for efficient indexing, the sparse composite codes can be easily converted to components of inverted indexes, for instance where each dimension is a posting list, and one needs only to store the document identifiers that belong to each posting list. In this way, the worst case for the posting list format is $C \log_2(N)$ bits per document.

Retrieving on this index can be done efficiently; for instance, at most $$\frac{CN}{L}$$

documents need to be scored. Further, retrieving can be performed in perfectly parallel fashion, as each cluster C can be computed and accessed separately from all the others. Such clusters can also be easily divided, for example, distributed into multiple, relatively weaker machines in terms of processing capability, so that simpler operations are needed from each machine for computation. As the example activations are one-hot at each cluster, example methods can use softmax-based activations in the activation function 108 to discretize each cluster.

Activation: An example activation method that may be performed by the activation layer 108 will now be described. Gumbel softmax is suitable for converting dense representations to a series of one-hot discrete distributions, and thus may be used in example methods. As disclosed, e.g., with respect to the reparametrization trick in Jang et al., Categorical reparameterization with Gumbel-softmax, arXiv preprint arXiv:1611.01144 (2016), such an activation function may be particularly suitable for parameterizing discrete distributions into sequences of one-hot vectors. A Gumbel softmax activation is the random mapping $\pi \mapsto y$ given by $y_i = v_i / \Sigma_i v_j$, where $v_i = \exp((G_i + \log(\pi_i))/\tau)$ and $G_i$ are independent standard Gumbel RVs, with CDF $\exp(-\exp(-x))$.

Example activation methods can use a straight-through estimator, e.g., as disclosed in Bengio et al., 2013, Estimating or Propagating Gradients Through Stochastic Neurons for Conditional Computation, arXiv:1308.3432 [cs.LG], in which the forward pass has the "hard" (binary) output of the Gumbel softmax and the backward gradients are computed using the distributional reparametrization trick (e.g., with temperature $\theta=100$). The forward pass for each cluster c e C can be described by:

$$g(x)_c = onehot\left(\underset{j \in 1 \ldots L}{\operatorname{argmax}}\left(G_{c,j} + \log(x)_{c,j}\right)\right)$$ (2)

Where $G_{c,j}$ is a sample from the Gumbel-softmax distribution associated with cluster c and coordinate j. On the other hand, gradients for each coordinate $l \in 1 \ldots L$ of a cluster $c \in C$ can be computed based on the Gumbel-softmax approximation:

$$g(x)_{c,l} = \frac{\exp\left((\log(x_{c,l}) + G_{c,l})/\tau\right)}{\sum_{k=1}^{L} \exp\left((\log(x_k) + G_k)/\tau\right)} \text{ for } j \in 1 \ldots L.$$ (3)

Sparse compression performed by the autoencoder 100 can be learned, for instance, during the finetuning of a Siamese-BERT model. In other example methods the sparse decomposition can be learned after, which can reduce the computation cost, and provide a larger training batch size. A larger batch size can ease the training of a balanced index.

Figure 2:
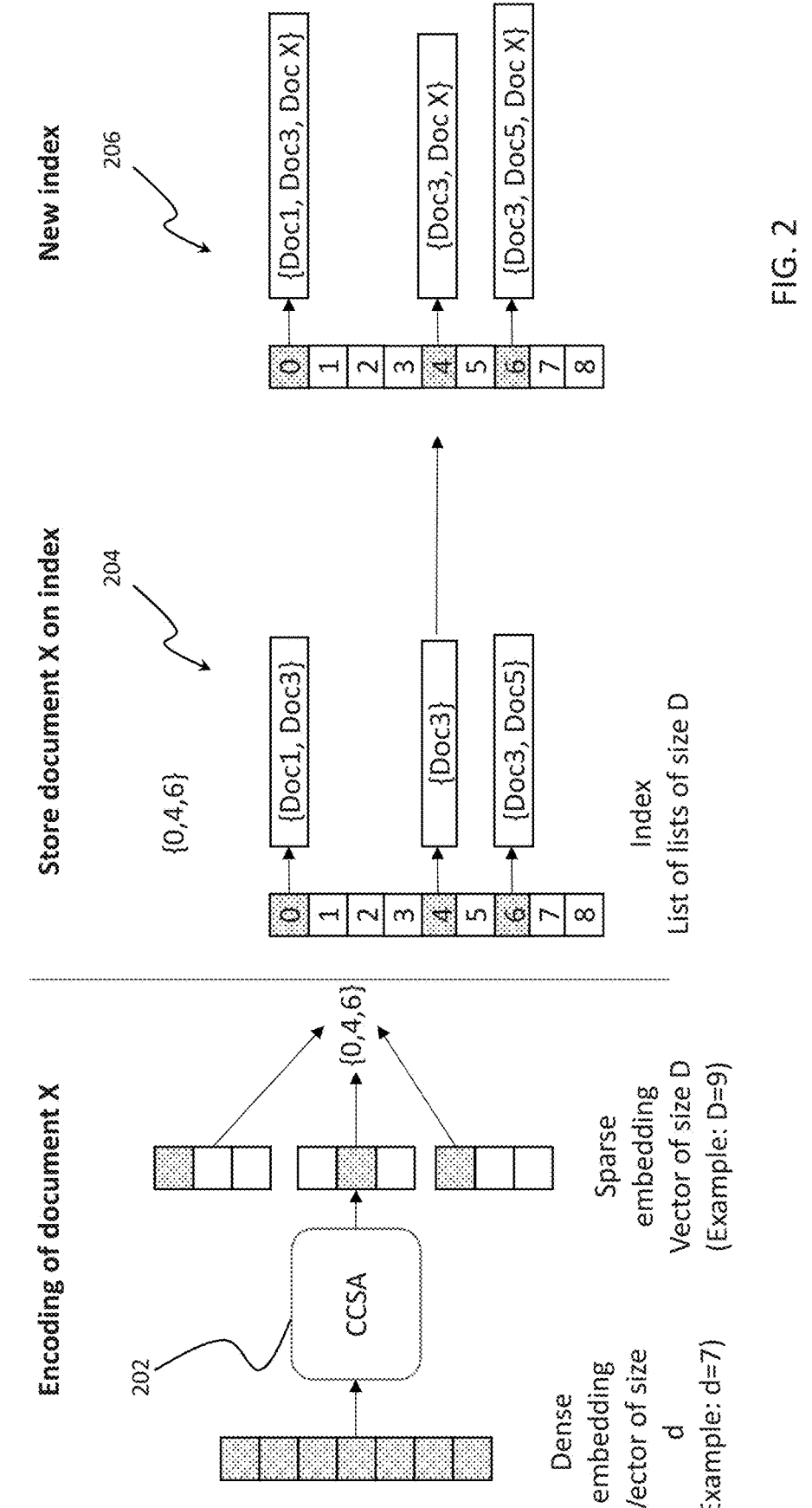
FIG. 2 shows an example method for processing a dense embedded vector for encoding and storing a document.

FIG. 2 shows an example method 200 that may be performed by a trained autoencoder (CCSA) 202 during runtime (inference) for processing a dense embedding vector of size d for a document, e.g., document X. The autoencoder 202, for instance, may be embodied in autoencoder 100, though the decoder 110 may be omitted (e.g., after the autoencoder is trained), and the encoder 102 and the activation function 108 may be used.

The dense embedding vector may be provided as input data. In the example dense embedding vector shown in FIG. 2, d=7. The autoencoder 202 encodes document X by transforming the dense embedding vector of size d into a sparse embedding vector of size D (here, D=9), which in the example includes C=3 clusters each having L=3 dimensions, where for the first cluster L=1 is activated, for the second cluster L=2 is activated, and for the third cluster L=1 is activated.

The sparse embedding vector for document X can be transformed into or organized by (or otherwise used to generate) one or more posting lists (e.g., {0, 4, 6}). In a storing phase 204, the encoded document X can then be stored on an index, which is embodied in a list of lists of size D. The new index 206 thus incorporates encoded document X.

This process can be repeated for each sample that is received to create or supplement the index. The index thus created or supplemented can then be stored and used for information retrieval.

Load-balancing regularizer: Although the composite codes may have properties suitable for efficient inverted indexing, it may also be desirable to ensure that the documents are well distributed in the sparse space. The autoencoder could, for example, ignore most of the dimensions and only use a subset to encode the documents in the database, which may occur if the autoencoder is trained without regularization.

To more fairly distribute the documents, example autoencoders 100 may include a load-balancing regularizer as a "fairness" regularization, which aims to force each of the D=LC dimensions to be equally activated by the N documents. An example regularizer can operate generally similarly to the "gini-batch" method (e.g., as disclosed in Klein et al, End-To-End Supervised Product Quantization for Image Search and Retrieval. 2019 IEEE/CVF Conference on Computer Vision and Pattern Recognition (CVPR) (2019), 5036-5045) or the FLOPS method (e.g., as disclosed in Paria et al, 2020. Minimizing FLOPs to Learn Efficient Sparse Representations, In International Conference on Learning Representations. https://openreview.net/forum?id= SygpC6Ntvr).

The FLOPS method disclosed in Paria et al. provides a relaxation of the number of FLOPS operations for sparse dot products and provides a connection to $l_1$ regularization by learning end-end sparse representations for image search. The gini-batch method disclosed in Klein et al. provides a Deep Product Quantization (DPQ) technique to provide more accurate retrieval and classification. This method reproduces product quantization in an end-to-end manner. A similar regularization to FLOPS is provided in Klein et al. for DPQ as "gini impurity" of the batch.

Example CCSA-based embodiments can be unsupervised in that they need not rely on data labels. Also, as with "non-deep" PQ, example embodiments may directly generate a balanced inverted index instead of, for instance, requiring a combination with other methods. Further, in example autoencoders, the load-balancing regularization may have the advantage of working directly with batch binary activations, creating a more precise approximation of the overall index.

It is useful to force all dimensions to be activated by the same (or at least closer to the same) amount of documents $$\left(\frac{N}{L}\right),$$

which would create a perfectly balanced (or at least more balanced) index. One way to accomplish this is to use a regularization of the root mean square error (RMSE) between the index statistics and the desired ones:

$$\mathcal{L}_{\mathcal{UR}}(X) = \sqrt{\frac{\sum_{j=1}^{D}\left(\left(\sum_{i=1}^{N}g(e(x_i))\right)_j - \frac{N}{L}\right)^2}{N}}, \tag{4}$$

where D is the total amount of dimensions, X is the matrix containing all the document embeddings and g(e(x)) is the output of the activation function (e.g., Gumbel softmax) applied over the encoder projection of the input embeddings.

An approximation of RMSE can be used, for instance, if all index statistics cannot be accessed during training. An example approximation can be based on the batch (B) statistics:

$$\mathcal{L}_{\mathcal{UR}}(x) = \sqrt{\frac{\sum_{j=1}^{D}\left(\left(\sum_{i=1}^{B}g(e(x_i))\right)_j - \frac{B}{L}\right)^2}{B}}, \tag{5}$$

where x is a batch of documents and B is the batch size. In this scenario, the higher the batch size, the smaller the approximation error between batch statistics and index statistics. The overall objective function $\mathcal{L}$ (x) of the autoencoder can then be described as:

$$\mathcal{L}(x)=\mathcal{L}_{\mathcal{MSE}}(x,f(x))+\lambda\mathcal{L}_{\mathcal{UR}}(x), \tag{6}$$

The first term in Equation (6) is the reconstruction loss (mean squared error over the batch), and the second term is the regularization, which is a root mean squared error (RMSE) between the optimal mean activation $$\left(\frac{B}{L}\right)$$

and the amount of activations of each dimension $$\sum_{j=1}^{D}\left(\left(\sum_{i=1}^{B}g(e(x_i))\right)_j\right).$$

To reduce latency of deep IR models, one possible approach is to simply employ compression of deep learning (DL) models, particularly on hashing and quantization, to first reduce the models' size before indexing the document representations. Methods such as those disclosed in Shu et al., 2018. Compressing Word Embeddings via Deep Compositional Code Learning. In International Conference on Learning Representations. https://openreview.net/forum?id=BJRZzFIRb, use composite codes to compress the input word embedding matrices for sentiment analysis and machine translation tasks.

The example autoencoder 100 can provide an index by compressing the final output of the model for search and retrieval tasks such as but not limited to Approximate Nearest Neighbor (ANN) tasks. Further, by focusing on unsupervised learning of the sparse embedding, example autoencoders 100 can be adapted to any task, instead of needing to adapt the method to each one, though at a potential cost in overall performance.

Further, example load balancing regularizers may work directly on binarized inputs (e.g., $L_0$ norm) instead of using approximations (e.g., $L_1$ and $L_2$ norms). The example autoencoder 100 architecture may allow use of binary representations during the training of the network, while still keeping gradients that resemble those from a max function. Providing a binary representation from the start allows example autoencoder models to better estimate the load balance of the final index, and can thus help the regularizer in enforcing a balanced index.

As described above, example load-balancing regularizers in example methods can use an approximation of the overall index distribution by the distribution of the batch. Thus, increasing the batch size can lead to improvements in load-balancing in example methods. For instance, refining the representations, as opposed to end-to-end learning, can allow for larger batch sizes.

While performing binary quantization of the embeddings may increase the query embedding time/memory size, such methods can reduce the inverted indexing retrieval and indexing costs. Example embedding methods can thus be useful in combination with, for instance, distillation methods for BERT models (e.g., for reducing the size of deep learning models) and/or quantization techniques (e.g., for reducing the size of the Transformer model, or to allow for more efficient computation). Combining example techniques can lead to faster/cheaper inference, which can help reduce query latency.

In an approximate nearest neighbor combination of inverted index files (IVF) (that is, a map from a word to a list of the documents containing that word) implemented in a FAISS framework, a clustering algorithm separates the examples of a support set in a number of centroids. By contrast, the example autoencoder 100 can learn to separate examples directly on the sparse representations. These clusters can be optimized to minimize the distance between their members and to keep a well-balanced index (i.e., documents per cluster of approximately $$\frac{N}{C}\Bigg)$$

Additionally, in order to avoid "missed by one" errors, it is also common to search a number of closest centroids (w) instead of retrieving only the closest one. By contrast, in the example autoencoder 100 the inverted index can be based on the learned representations instead of clustering the documents and thus does not need to search a number of closest centroids, only the dimensions that are present in the query.

To further reduce the number of operations to compute the distances between the found elements in the centroids and the query, product quantization (PQ) can be used, e.g., as disclosed in Jegou et al., 2010, Product quantization for nearest neighbor search. IEEE transactions on pattern analysis and machine intelligence 33, 1 (2010), 117-128. Generally, product quantization encodes a vector x by decomposing it into chunks (e.g., x[k*i:][:k]) and quantizing each chunk independently (e.g., with k-means clustering). PQ separates the embedding of D into C representations of size L, and then quantizes the L-sized subpartitions to b bits. Comparative experiments disclosed herein considered b=8, so that a PQ with C representations was encoded in C bytes, and accordingly PQ(b) was used to describe this behavior.

In operation of the example autoencoder 100, distances can be computed in the sparse binarized domain, while PQ distances are computed on the whole D, but with quantized representations and lookup tables. An OPQIVFPQ index will thus search based on the quantized representations and will limit the amount of searches based on c and w, while reducing the storage and amount of operations per distance computation using C and L.

Retrieval: In example input data processing and IR methods, vectors can be indexed using, for instance, an inverted index or a graph-based method. For graph-based methods a framework such as FAISS/Vespa (http://vespa.ai/)/HN- SWLib (disclosed in Malkov et al., Efficient and Robust Approximate Nearest Neighbor Search Using Hierarchical Navigable Small World Graphs, IEEE Transactions on Pattern Analysis and Machine Intelligence 42 (2020), 824-836) can be used for indexing.

In an example method for inverted indexing using sparse composite code vectors, a set of lists is used where each dimension is associated with a list of documents. For instance, as shown in FIG. 2, for each dimension activated by a document, its ID may be added to the list corresponding to that dimension. As a result, while each document is encoded by C $\log_2(L)$ bits, example methods can instead store C $\log_2(N)$ bits of information for each document, and ideally each list contains $$\frac{N}{L}$$

documents.

Figure 3:
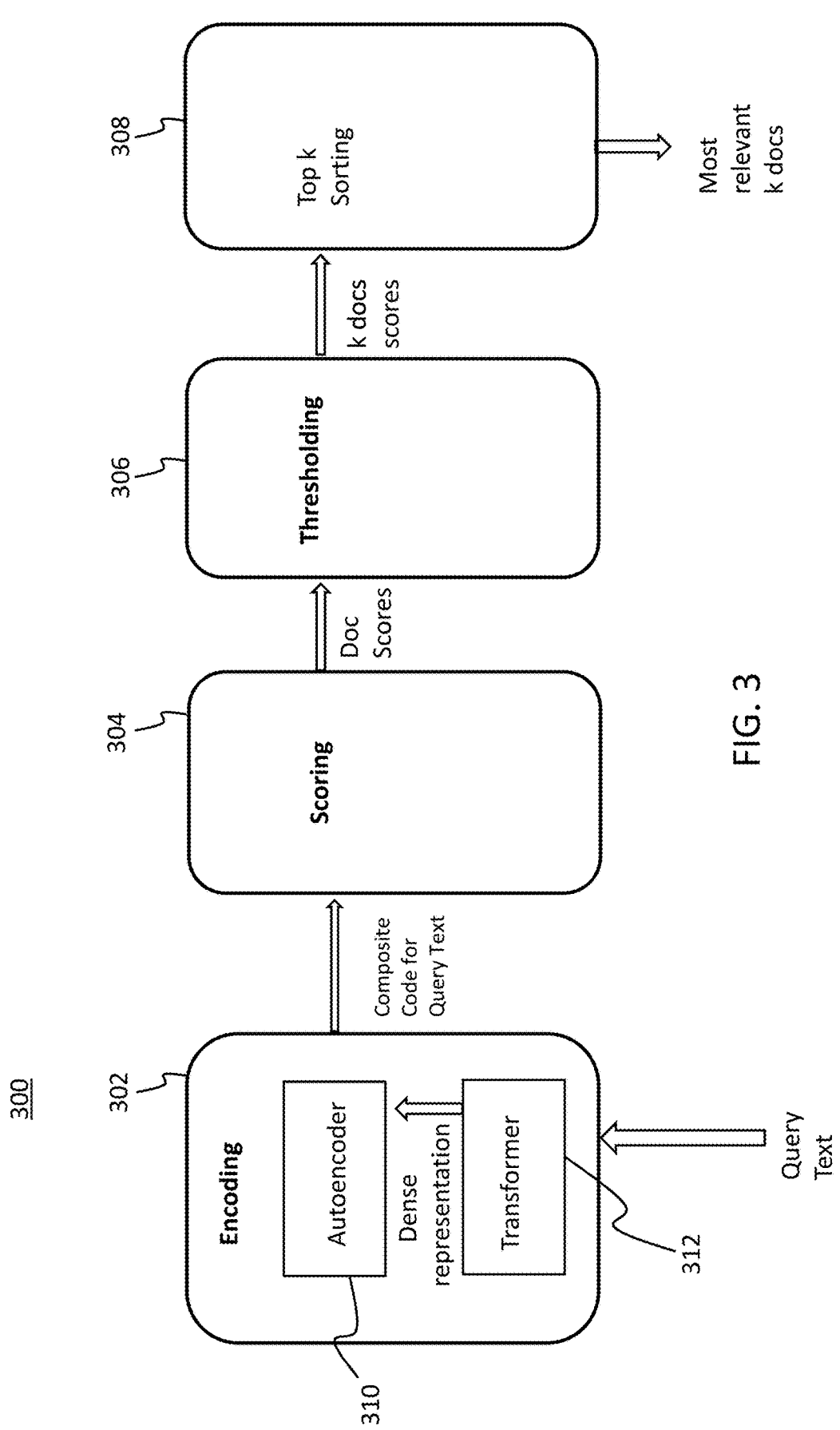
FIG. 3 shows an example retrieval architecture that incorporates the CCSA-based autoencoder of FIG. 1.

FIG. 3 shows an example retrieval architecture 300 incorporating the CCSA-based autoencoder 100. As the autoencoder 100 can perform information retrieval during inference (runtime), the decoder 110 used for training may be omitted from the autoencoder for IR, and the encoder 102 and activation 108 may be used. The example retrieval architecture 300 includes an encoding phase 302, a scoring phase 304, a thresholding phase 306, and a sorting (e.g., top k sorting) phase 308.

Each phase 302, 304, 306, 308 may be implemented using one or more processors, including graphics processing units (GPUs), central processing units (CPUs), or combinations of GPUs and CPUs (which may be referred to collectively as a processor), using suitable executable instructions stored in a memory. Reference herein to "a memory" can likewise refer to a plurality of memory units or memories distributed among various devices, processors, storage units, etc., and is not intended to be limited to a single memory. Suitable types and numbers of processors may be selected, configured, and arranged to provide serial or parallel operation, and/or to distribute operations to a best-suited processor. As a non-limiting example, over each phase, the encoding phase 302 may be executed, for instance, on graphics processing units (GPUs), for instance, while the other phases 304, 306, 308 may be suitably efficient and parallel to run efficiently on, for instance, central processing units (CPUs). One or more additional processors may be provided for distribution of tasks and/or providing inputs and receiving results of processing. The example encoding phase 302 can incorporate an autoencoder 310 such as the CCSA-based autoencoder 100, e.g., including the encoder 102 and activation 108.

A nonlimiting example retrieval method can be implemented, for instance, using suitable instructions (e.g., frameworks and libraries) such as pytorch for the encoding phase 302, numba for the scoring 304 and thresholding 306 phases, and numpy for the sorting phase 308. Table 1 summarizes the computational cost and potential cost under an example parallelization of scoring 304, thresholding 306, and sorting 308 phases, particularly example worst case complexity (WCC), amount of processes (P), and complexity of each individual process (CP).

TABLE 1

| Phase | WCC | P | CP |
|---|---|---|---|
| Scoring | $O\left(C\frac{N}{L}\right)$ | C | $O\left(\frac{N}{L}\right)$ |

TABLE 1-continued

| Phase | WCC | P | CP |
|---|---|---|---|
| Thresholding | O (N) | N | O (1) |
| TopkSort | $O\left(C\frac{N}{L}\log\left(C\frac{N}{L}\right)\right)$ | 1 | $O\left(C\frac{N}{L}\log\left(C\frac{N}{L}\right)\right)$ |

Encoding: In the encoding phase 302, text of a query may be encoded to the composite codes, e.g., using the autoencoder 310. In example methods, the query text is first encoded using a pre-trained transformer 312, e.g., a BERT transformer such as disclosed in Devlin et al., BERT: Pre-training of Deep Bidirectional Transformers for Language Understanding, CoRR abs/1810.04805 (2018). arXiv: 1810.04805, to generate dense representations. The dense representations are then passed to the example autoencoder 310, which performs a CCSA-based autoencoding method such as described herein to generate a composite code sparse representation (a sparse embedding vector).

The encoding phase 302 can be the most cost intensive phase of example retrieval methods herein, while in other dense approaches most processing time is consumed by steps that are downstream of query encoding. For illustration only, an implementation of the encoding phase 302 may have a latency of about 8 ms (or larger, say, about 35 ms, if a CPU is used to compute the encoding), while encoding in some other dense approaches may have a latency of about 3 ms on comparable hardware. However, such other dense methods may have more than 100 ms of latency for the remaining retrieval steps, even using GPUs, while example CCSA-based methods may have, say, only about 10 ms of latency for the corresponding phases 304, 306, 308, using CPUs.

Scoring: The scoring phase 304 scores the documents based on the inverted index by searching the encoded query on the index. If the inverted index is well-behaved, a complexity of $$O\left(C\frac{N}{L}\right)$$

can be expected, which is smaller than when using a dense embedding $O(ND_{dense})$, where $D_{dense}$ is the number of dimensions of the dense embedding. The example scoring phase 304 can be twice parallelized: first by dividing into C threads (one per activated cluster), and then each one of these threads can be divided into $$\frac{N}{L}$$

threads (one per document activated by the combination CL) with only a very small probability of collision (i.e., two threads scoring the same document at the same time).

Thresholding: After scoring, the thresholding phase 306 can remove candidates that are known to be outside the top k sorting range, e.g., via score thresholding. This step can have a complexity of O(N), and can be easy to parallelize. For instance, one can easily divide the documents over multiple processes and remove from consideration all documents that have a score that is less than or equal to a threshold score t. This threshold score can be chosen, for instance, using the training set queries and by aiming for a minimum of k documents retrieved over all training queries. The thresholding phase 306 can also be omitted in example methods.

Sorting: The sorting (e.g., top k sorting) phase 308 sorts the obtained scores in order to obtain the most relevant k documents. Doing so without thresholding would be the most computationally expensive of the last three retrieval phases 304, 306, 308, with a worst-case complexity of O(N log(N)). However, after applying a threshold (with at least t=0), this complexity can be reduced, in the worst case, to $$O\left(C\frac{N}{L}\log\left(C\frac{N}{L}\right)\right),$$

and can be reduced further by determining and adequate threshold value. As a nonlimiting example, in experiments threshold values have been determined where the median amount of documents to sort is smaller than, say, 20 k (approximately 400 times less than N and $$\frac{N}{L}.$$

In other examples, linear sorting algorithms such as radix sort, may be implemented using suitable software.

When scores are integers, there may be a higher probability of ties when compared to other retrieval methods. While this may make example results non-deterministic depending on a tie-breaking method that is used, this has little impact on retrieval performance of example methods.

Figure 4:
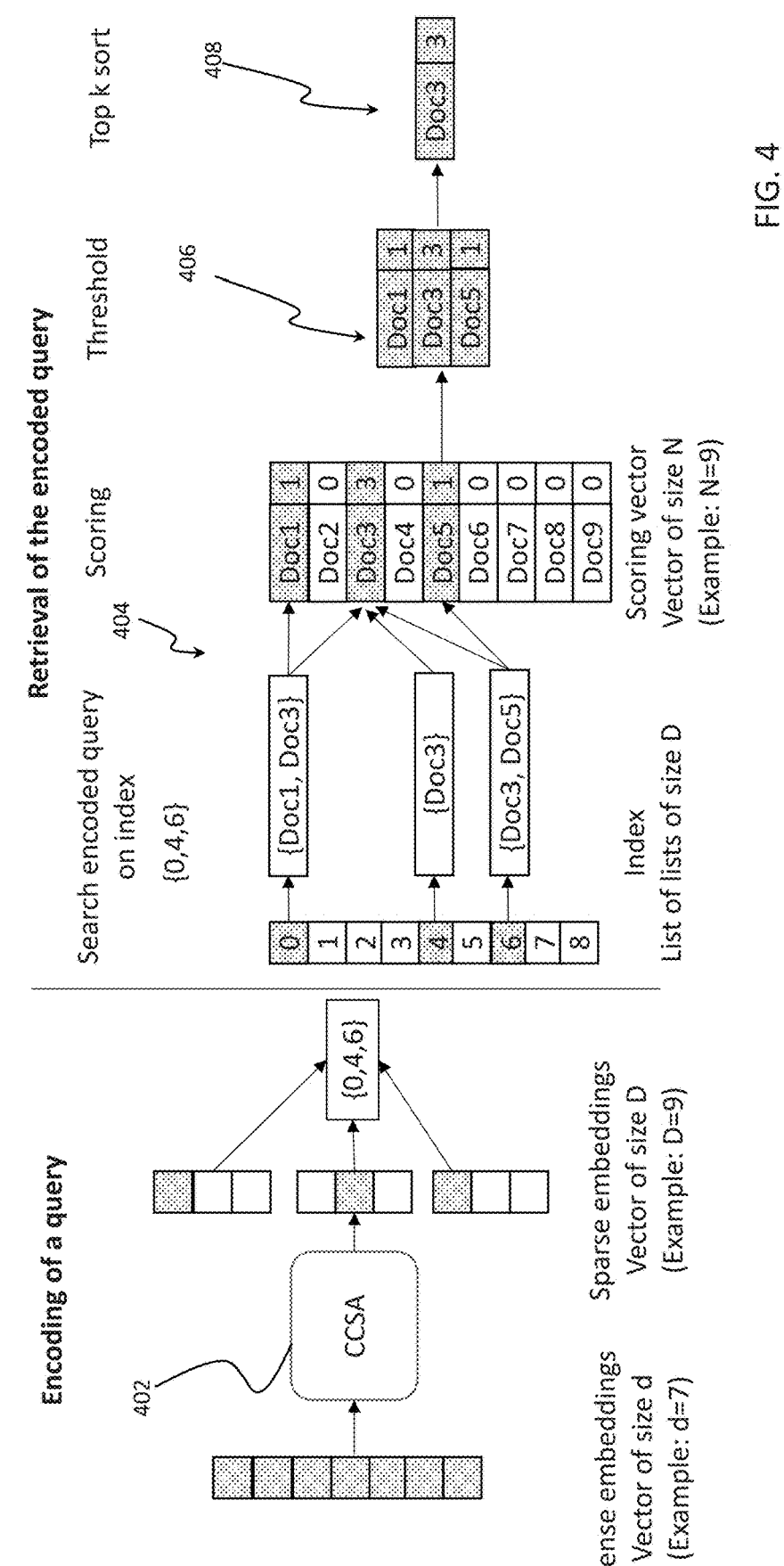
FIG. 4 shows an example information retrieval method in response to a received dense embedding of a query.

FIG. 4 shows an example information retrieval (IR) method 400 that may be performed using a trained autoencoder (CCSA) 402 for processing a dense embedding vector of size d for a query. The autoencoder 402, for instance, may be embodied in autoencoder 100 or 310, though the decoder 110 may be omitted and the encoder 102 and activation 108 may be used for IR.

The dense embedding vector may be provided as input data, for instance from a Transformer (e.g., transformer 312) processing a received query text. In the example dense embedding vector shown in FIG. 4, d=7. During an encoding phase, the autoencoder 402 encodes the query by transforming the dense embedding vector of size d into a sparse embedding vector of size D (here, D=9), which includes C=3 clusters each having L=3 dimensions, where for the first cluster L=1 is activated, for the second cluster L=2 is activated, and for the third cluster L=1 is activated.

The sparse embedding vector for the input query can be used to create a list of one or more posting lists to visit. For example, the sparse embedding vector can be used to determine which posting lists to score. During a scoring phase 404, this set of posting lists (e.g., associated with the encoded query) can then be used to search on the index (alternatively, the sparse embeddings vector may be used to search on the index directly). The example index may be embodied in a list of lists of size D, as provided herein. A scoring vector, e.g., of size N, representing the amount of documents in the index (here, N=9) is generated based on the search. For instance, in FIG. 4, document 3 corresponds to items 0, 4, and 6, while documents 1 and 5 corresponded to items 0 and 6, respectively. Thus, document 1 and document 5 each receive a score of 1, and document 3 receives a score of 3, while the remaining documents (2, 4, 6-9) receive scores of zero.

In a thresholding phase 406, the documents receiving a score of at least one (here, documents 1, 3, and 5) and their associated scores (1, 3, 1) are passed to a sorting phase 408. In the sorting phase 408, the most relevant document, document 3, is retrieved and output. Alternatively, the top three documents may be sorted and output, or the top two documents (assuming a tiebreaker between documents 1 and 5) may be sorted and output.

Network Architecture

Figure 5:
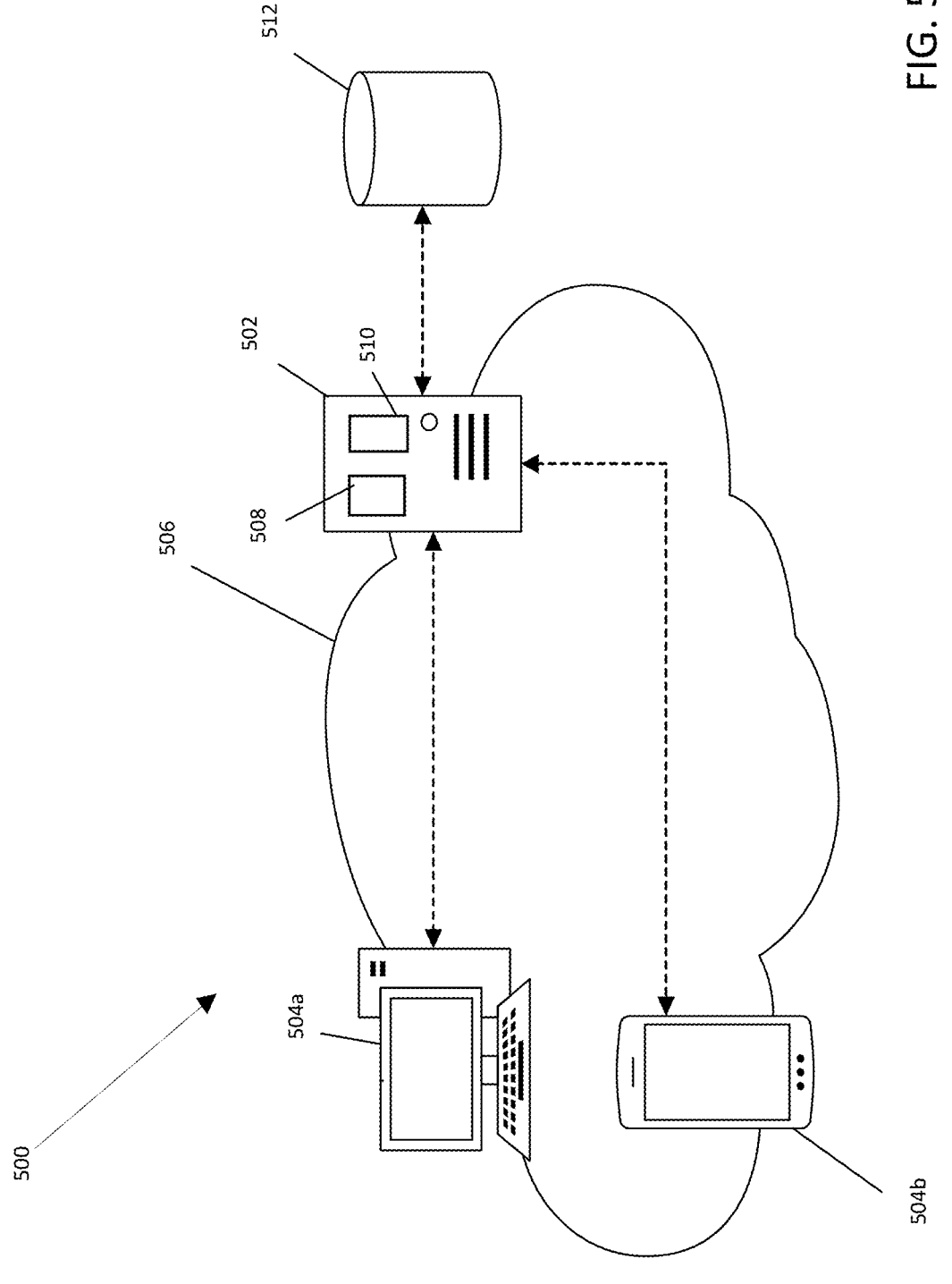
FIG. 5 shows an example network architecture for implementing various example methods.

Example systems, methods, and embodiments for input data processing, document indexing and storing, and/or information retrieval may be implemented within a network architecture 500 such as the architecture illustrated in FIG. 5, which comprises a server 502 and one or more client devices 504a, 504b that communicate over a network 506 which may be wireless and/or wired, such as the Internet, for data exchange. The server 502 and the client devices 504a, 504b can each include a processor, e.g., processor 508 and a memory, e.g., memory 510 (shown by example in server 502), such as but not limited to random-access memory (RAM), read-only memory (ROM), hard disks, solid state disks, or other non-volatile storage media. Memory 510 may also be provided in whole or in part by external storage in communication with the processor 508.

The autoencoder architecture 100 in FIG. 1, the autoencoder 202 and storing phase 204 in FIG. 2, the autoencoder 402, scoring phase 404, threshold phase 406, and sorting phase 408 and/or the retrieval architecture 300 in FIG. 3, for instance, may be implemented in the processor 508 or other processor in the server 502 and/or processors in client devices 504a, 504b. It will be appreciated, as explained herein, that the processor 508 can include either a single processor or multiple processors operating in series or in parallel, and that the memory 510 can include one or more memories, including combinations of memory types and/or locations. Server 500 may also include, but are not limited to, dedicated servers, cloud-based servers, or a combination (e.g., shared). Storage, for instance, for storing documents to be retrieved, trained models, etc., can be provided by local storage, external storage such as connected remote storage 512 (shown in connection with the server 502, but can likewise be connected to client devices), or any combination.

Client devices 504a, 504b may be any processor-based device, terminal, etc., and/or may be embodied in a client application executable by a processor-based device, etc. Client devices may be disposed within the server 502 and/or external to the server (local or remote, or any combination) and in communication with the server. Example client devices 504 include, but are not limited to, autonomous computers 504a, mobile communication devices (e.g., smartphones, tablet computers, etc.) 504b, wearable devices, computer vision devices, cameras, virtual reality, augmented reality, or mixed reality devices (not shown), or others. Client devices 504 may be configured for sending data to and/or receiving data from the server 502, and may include, but need not include, one or more output devices, such as but not limited to displays, printers, etc. for displaying or printing results of certain methods that are provided for display by the server. Client devices may include combinations of client devices.

In an example document storing method the server 502 or client devices 504 may receive one or more documents (for generating dense embeddings) or receive dense embeddings of the documents (if already generated) as input data from any suitable source, e.g., by local or remote input from a suitable interface, or from another of the server or client devices connected locally or over the network 506. Trained models such as the example autoencoder 100, 202, 310, and/or the Transformer 312 (if provided) can be likewise stored in the server (e.g., memory 510), client devices 504, external storage 512, or combination. In some example embodiments provided herein, training and/or inference may be performed offline or online (e.g., at run time), in any combination. Results can be output (e.g., displayed, transmitted, provided for display, printed, etc.) and/or stored for retrieving and providing on request.

In an example retrieval method, e.g., IR method, the server 502 or client devices 504 may receive a query, or a dense embedding of a query (if already generated), from any suitable source, e.g., by local or remote input from a suitable interface, or from another of the server or client devices connected locally or over the network 506. Trained models such as the example autoencoder 100, 402, 310, and/or the Transformer 312 (if provided) can be likewise stored in the server (e.g., memory 510), client devices 504, external storage 512, or combination. Results can be output (e.g., displayed, transmitted, provided for display, printed, etc.) and/or stored for retrieving and providing on request.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor.

Embodiments described herein may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Experiments

Comparative experiments were conducted using the MSMARCO dataset (Bajaj et al., Ms marco: A human generated machine reading comprehension dataset. arXiv preprint arXiv:1611.09268 (2016)) and evaluated on the devset of MSMARCO and TREC2019 (Voorhees and Angela Ellis (Eds.). 2019. Proceedings of the Twenty-Eighth Text REtrieval Conference, TREC 2019, Gaithersburg, Maryland, USA, Nov. 13-15, 2019. NIST Special Publication, Vol. 1250. National Institute of Standards and Technology (NIST). Two types of methods were compared for first stage rankers:

Bag-of-Words (BOW): Traditional information retrieval methods were considered based on inverted indexes such as BM25 (Yang et al., 2017. Anserini: Enabling the use of Lucene for information retrieval research, In Proceedings of the 40th International ACM SIGIR Conference on Research and Development in Information Retrieval, 1253-1256) and BM25 with document expansion as disclosed in docT5query (Rodrigo Nogueira, From doc2query to docTTTTTquery, 2019). Retrieval using these methods was implemented with pisa, e.g., as disclosed in Mallia et al., PISA-performant indexes and search for academia, Proceedings of the Open-Source IR Replicability Challenge (2019).

(Siamese-BERT): The baseline for the dense representation experiments was a standard Siamese Transformer model with CLS pooling (Reimers et al., 2019. Sentence-BERT: Sentence Embeddings using Siamese BERT-Networks. In Proceedings of the 2019 Conference on Empirical Methods in Natural Language Processing. Association for Computational Linguistics. http://arxiv.org/abs/1908.10084), for which the models were implemented in pytorch (Paszke et al. 2019, PyTorch: An Imperative Style, High-Performance Deep Learning Library, In NeurIPS.43).

For the Siamese model, different ANN or indexing techniques were compared:

OPQ(b)-X-PQ: A quantization method where data is first projected and rotated so that it can be better quantized into b bits (OPQ) and then quantized to b bits (PQ) in an unsupervised manner. Data is then indexed using (X) that could be either IVF or HNSW (X). Experiments used the FAISS library implementation.

IVF(C, w): Inverted index method, where data is clusterized into C clusters using k-means, and all elements were compared to the closest w clusters to the query. Most of the distance computations could be accelerated by precomputing lookup tables (LUTs). The FAISS implementation of the index was used. There was almost no memory overhead in the creation of the index (8 bytes per document in the database and 256Cb for the lookup tables).

HNSW (m, efSearch, efConstruction): A hierarchical graph-based ANN method disclosed in Malkov et al., Efficient and Robust Approximate Nearest Neighbor Search Using Hierarchical Navigable Small World Graphs, IEEE Transactions on Pattern Analysis and Machine Intelligence 42 (2020), 824-836. In this graph, nodes are the indexed documents and edges are generated in order to allow for easy traversal from a source node (either random or heuristically chosen) to the closest neighbors of a query. The graph was created so that each node has a maximum m edges, which leads to an overhead of 8 m bytes per element in the database. The parameters of efConstruction and efSearch performed a tradeoff between index precision and computational cost on the indexing and retrieving steps. The FAISS implementation of the index was used.

CCSA(C,L): Model-based sparse composite codes generated using the autoencoder 100 according to an example embodiment, implemented with pytorch (Paszke et al., PyTorch: An Imperative Style, High-Performance Deep Learning Library, 2019, In NeurIPS) (encoding and projection) and numpy/numba (retrieval) (Harris et al., Array programming with NumPy, Nature 585, 6825, September 2020, 357-362; Lam et al., Numba: A llvm-based python jit compiler, In Proceedings of the Second Workshop on the LLVM Compiler Infrastructure in HPC, 2015, 1-6).

Retrieval Metrics: First stage rankers were evaluated, with the ranking accuracy using MRR@10 and Recall@1000. Mean latency was also evaluated on 1 query at a time, and throughput was evaluated using "full batches" (6980 queries per batch for MSMARCO and 200 for TREC). Some experiments focused on improvement on the latency of retrieval, while maximizing Recall@1000. Other metrics were also provided.

Latency was considered as the mean time it took to process a query, with only one query per batch. Throughput was considered as the mean amount of queries per second, while processing all the queries as a single batch. For example, in the case of MSMARCO there were 6980 queries in a batch and for TREC there were 200 queries in the batch.

The experiments followed the measurement procedure disclosed in Hofstätter and Allan Hanbury. 2019, Let's measure run time! Extending the IR replicability infrastructure to include performance aspects. SIGIR Open-Source IR Replicability Challenge (OSIRRC) (2019), and results were considered using the same machine for comparison. All tasks were executed on an INTEL™ XEON™ E5-2670v3 @ 2.30 GHz CPU, with no access to GPU (to compare all elements using the same hardware, although this favors the example BOW implementation), and with 250 GB of RAM available.

In experiments comparing methods according to example embodiments, (CCSA (Composite Code Sparse Autoencoders)), to conventional BOW inverted indexes and ANN inverted indexes, the following hyperparameters were used: D=65536, C=256, L=256, so that the documents were quantized to 256 bits. To compare CCSA-based codes to product quantization for graph-based ANN methods, two different constructions were used, one with 256 bytes (D=4096, C=2048, L=2) and one with 48 bytes per document (D=768, C=384, L=2).

The example models for the CCSA autoencoder 100 were implemented using pytorch, and the retrieval was implemented using numpy and numba. The networks were trained using the training queries and documents from MSMARCO, with ADAM optimization (e.g., Kingma et al., Adam: A method for stochastic optimization, arXiv preprint arXiv: 1412.6980, 2014) using a learning rate of 0.0001. The training was considered finished after 10 epochs for the first (BOW/ANN inverted indexes) comparison, and 100 epochs for the second (graph-based ANN) comparison. Gumbel-softmax temperatures of 100 and 1, and regularization factors λ of 100 and 0, were used for the first and second comparisons, respectively.

For BOW methods Anserini (Yang et al., 2017) and PISA (Mallia et al., 2019. PISA: performant indexes and search for academia, Proceedings of the Open-Source IR Replicability Challenge (2019)) were used. For PISA, the implementation from Mackenzie et al., 2020, Efficiency implications of term weighting for passage retrieval, In Proceedings of the 43$^{rd}$ International ACM SIGIR Conference on Research and Development in Information Retrieval, 1821-1824, was used. BM25 and docT5 used the same BM25 parameters (k1=0.82; b=0.62) and were evaluated under the block wand scoring algorithm on PISA.

Comparison of CCSA to BOW and ANN Inverted Indexes

For a comparison with inverted index approaches, the example CCSA-based method was compared with its baselines (networks that generate dense embeddings) and other methods of sparse retrieval that do not use dense embeddings, with a focus on latency, as the latency of deep information retrieval has a significant effect on user satisfaction. Throughput of all methods was evaluated to demonstrate the capacity of example methods to retrieve queries in parallel, and to provide a clearer comparison with BOW sparse retrieval methods, as PISA was used for such methods that did not allow for intra-query parallelism and the FAISS indexes were not optimized for latency.

Tables 2-3 show results of comparative experiments on the MSMARCO and TREC-2019 datasets respectively. When compared to the prior sparse retrieval methods CCSA greatly outperformed BM25 on Recall@1000 for MSMARCO (but not for TREC-2019), while keeping similar latency (though losing on throughput). Compared to docT5, CCSA methods achieved comparable retrieval latency (approximately 15 ms), though not overall latency (PISA/Anserini does not perform intra-query parallelism).

CCSA methods also achieved better MRR@10 but lost in Recall@1000 (where docT5 was better than the dense baseline) and batched-throughput.

TABLE 2

| Method | Latency | Throughput | MRR@10 | Recall@1000 |
|---|---|---|---|---|
| | Sparse retrieval (PISA) | | | |
| BM25[46] | 12.06 | 2020 | 0.1881 | 86.0% |
| docT5[38] | 16.22 | 1516 | 0.2768 | 94.7% |
| | Sparse retrieval (Ansersini) | | | |
| BM25[46] | 79(55[31]) | 200 | 0.1881 | 86.0% |
| docT5[38] | 85(64[31]) | 100 | 0.2768 | 94.7% |
| | Dense embeddings | | | |
| BERTSiamese[45] | 2419.3 | 20.9 | 0.3173 | 93.8% |
| | Proposed sparse embeddings | | | |
| CCSA(256,256) | 55.3‡ | 39.2 | 0.2892 | 90.60% |
| | ANN Inverted Indexing | | | |
| OPQ(256)-IVF(1000,100)-PQ | 351 ms | 40.3 | 0.3019 | 90.30% |

TABLE 3

| Mathod | Latency | Throughput | NDCG@10 | Recall@1000 |
|---|---|---|---|---|
| | Sparse retrieval | | | |
| BM25[46] | 13.90 | 441 | 0.4980 | 73.97% |
| docT5[38] | 16.21 | 729 | 0.6407 | 80.11% |
| | Sparse retrieval (Anserini) | | | |
| BM25[46] | 70(55[31]) | 200 | 0.4980 | 73.97% |
| docT5[38] | 85(64[31]) | 100 | 0.6407 | 80.11% |
| | Dense embeddings | | | |
| BERTSiamese[45] | 2978.8 | 19.2 | 0.6376 | 63.97% |
| | Proposed sparse embeddings | | | |
| CCSA(256,256) | 58.8‡ | 45.2 | 0.5833 | 59.47% |
| | ANN Inverted indexing | | | |
| OPQ(256)-IVF(1000,100)-PQ | 313.7 ms | 36.6 | 0.613 | 58.12% |

From both Tables 2 and 3, it can be observed that most of the latency from example CCSA methods was in the overhead created by the encoding and the projection (42 ms) and not on the retrieval itself (MSMARCO—13.5 ms, TREC-2019—16.8 ms). Encoding efficiency may be further improved, for instance, using techniques such as cross-architecture knowledge distillation (Hofstätter et al., 2020, Improving Efficient Neural Ranking Models with Cross-Architecture Knowledge Distillation. arXiv:2010.02666) and/or ANN contrastive learning (Xiong et al., 2021, Approximate Nearest Neighbor Negative Contrastive Learning for Dense Text Retrieval. In International Conference on Learning Representations, https://openreview.net/forum?id=zeFrfgyZln). Efficiency can also be improved by, for instance, employing a first (retrieval) stage that combines BOW and Siamese embeddings, with a minimal change in latency (as BOW does not perform intra-query parallelism) and throughput.

Comparison of CCSA Codes to Product Quantization for Graph-based ANN Methods: Additional experiments compared example CCSA methods to product quantization (PQ) methods for combining with ANN graph-based methods. Example CCSA-based methods here focused on the binary quantization of the embeddings, without forcing sparsity (e.g., with L=2 a fully binarized embedding is provided that occupies C/8 bytes). This can be seen as quantizing the original embedding vectors from 768*4 bytes to a smaller footprint.

A comparison was made with OPQHNSWPQ in two scenarios, one where the same budget (256 bytes per document) is provided as in earlier experiments, and a more compressed scenario with only 64 bytes. The parameters of HNSW were set so that the total overhead is 256 bytes per document (m=32), so that indexing takes less than 20 minutes (efConstruction=80) and search using example CCSA quantized embeddings is fast and accurate (efSearch=512).

Tables 4 and 5 show comparative results for MSMARCO and TREC2019, respectively. In the results, the overhead of BERT-Siamese encoding was omitted to better compare the models, as all models were subjected to it. However, the overhead caused by the sparse projection was included. For both datasets, example CCSA methods performed very well for the larger budget in comparison to OPQPQ in terms of latency and throughput.

TABLE 4

| Method | Latency | Throughput | MRR@10 | Recall@1000 |
|---|---|---|---|---|
| | 256 bytes per document | | | |
| CCSA(2048,2) HNSW | 10.3 | 1718.5 | 0.3023 | 92.01% |
| OPQPQ(256) HNSW | 12.4 | 1346.0 | 0.3099 | 91.61% |
| | 64 bytes per document | | | |
| CCSA(256,2) HNSW | 10.3 | 2036.8 | 0.2727 | 90.03% |
| OPQPQ(64) HNSW | 7.7 | 3530 | 0.3011 | 90.17% |

TABLE 5

| Method | Latency | Throughput | NDCG@10 | Recall@1000 |
|---|---|---|---|---|
| | 256 bytes per document | | | |
| CCSA(2048,2) HNSW | 11.4 | 720.9 | 0.5796 | 64.38% |
| OPQPQ(256) HNSW | 13.5 | 954 | 0.6076 | 60.70% |
| | 64 bytes per document | | | |
| CCSA(256,8) HNSW | 11.0 | 904.7 | 0.5916 | 62.60% |
| OPQPQ(256,8) HNSW | 7.9 | 2370 | 0.6153 | 60.55% |

Evaluation of CCSA-based Index Behavior and Effect of Regularization: As described above, by using a straight-through estimator in example CCSA-based methods, it is possible to directly address the binary representations, which can improve the control of the index balancing. Further experiments thus considered the behavior of an example CCSA-based index and the influence of the example regularizer. The index-balancing was compared by varying the regularization parameter and the batch size.

Figure 6:
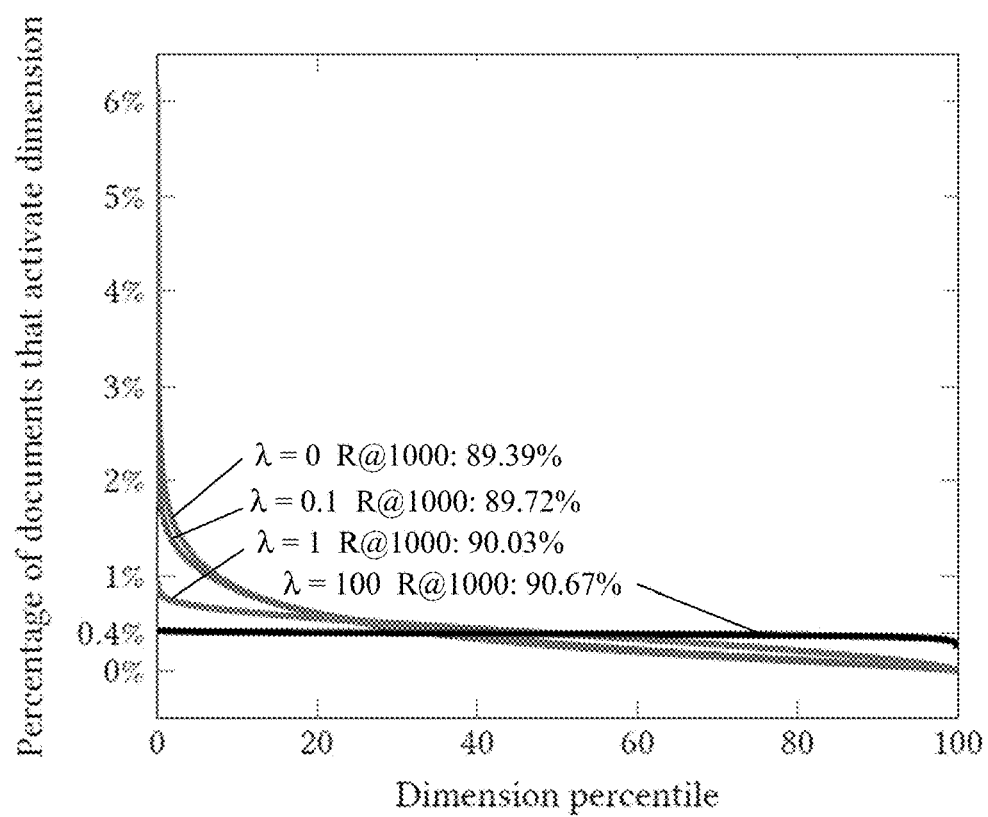
FIG. 6 illustrates an example index balance for various experimental networks implementing CCSA-based autoencoders, showing effects of an example regularizer.

The experiments first trained CCSA networks with the hyperparameters used for the inverted index comparison and changed the value of λ so that λ∈[0,0.1,1,10,100]. 100 was the default value used for the experiments, and 0 referred to no index-balancing regularization. FIG. 6 shows the index balance for the various experimental networks, where the Recall@1000 of each network is shown in the legend. As λ increased, the balance of the index improved, with a very small variation between the most used dimensions and the lowest ones for λ=100 and a very large variation for λ=0.

Moreover, the Recall@1000 was directly proportional to $\lambda$, showing further benefits of a well-behaved index.

Figure 7:
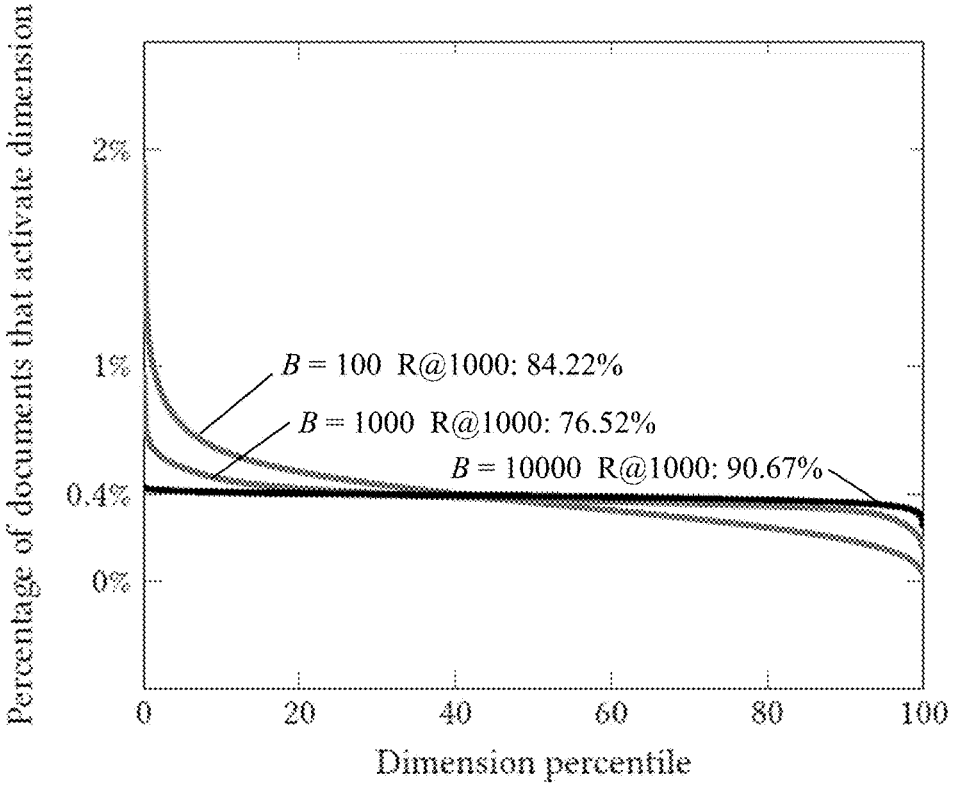
FIG. 7 shows a comparison of CCSA-based autoencoders, showing effects of various batch sizes.

Further experiments considered the effect of batch size, where B was varied between B∈[100, 1000, 10000] (10000 was the batch size used in the inverted index comparison and in the regularization evaluation). Results of varying the batch size B for MSMARCO are shown in FIG. 7. A perfectly balanced index would have all dimensions activated by $$\frac{1}{L} \approx 0/4\%$$

of the documents.

As expected, the best Recall@1000 and index balance were achieved by the greater batch size. If a smaller batch size is used, a smaller regularization factor of more intricate hyperparameter search may be used to improve convergence.

Example retrieval methods herein can thus combine deep unsupervised binary sparse representations, provided by composite code sparse autoencoders, with Transformer-based dense embeddings, to provide more efficient retrieval. Such methods can provide, among other benefits, significantly improved latency over conventional sparse retrieval approaches with only a small ranking performance cost. Further, example methods can provide improved latency and throughput with similar recall versus comparable ANN approaches.

In comparison with classical sparse retrieval approaches, example methods can obtain better latency and MRR. Further, example methods are scalable in that as dense embeddings models improve in terms of recall, example methods can improve in recall as well in comparison with classical sparse retrieval approaches, as they can be based on an approximation of those models.

Additionally, for graph-based ANN, where for a slight memory overhead one is capable of greatly reducing the retrieval latency and increase accuracy at a small memory overhead cost, example CCSA-based methods can be applied as a binary quantization of dense embeddings, providing results that are competitive with methods such as product quantization.

Example CCSA-based methods can be applied to various parallel processing and/or processor distribution (CPU and GPU) configurations, providing further efficiency benefits over conventional methods. Distributed processor-based system performing example methods can be provided.

Example CCSA-based methods can be used for various information retrieval applications where it is desirable to reduce latency with a relatively small performance cost. Example applications of CCSA-based methods include, but are not limited to, search, computer vision, recommendation tasks, and question answering, among others.

According to an aspect, embodiments herein provide, among other things, a method for creating an index for information retrieval, the method being implemented by a processor and memory, the method comprising: (a) receiving a set of input data, wherein each element of data in the set is a dense representation; (b) generating a composite code from the dense representation, the composite code comprising C clusters of dimension L; (c) using an activation function to generate a sparse representation from the composite code, the sparse representation comprising a binary representation; (d) repeating steps (a)-(c) for each element of data in the set of input data; (e) creating an index based on each of the sparse representations generated at step (c) corresponding to each element of data in the set of input data; and (f) outputting the index for information retrieval. In addition to any of the above features in this paragraph, each of the dense representations may represent one or more of text data, image data and audio data. In addition to any of the above features in this paragraph, each of the dense representations may represent text data and the dense representation may be generated using a probabilistic model. In addition to any of the above features in this paragraph, the probabilistic model may comprise a Transformer model. In addition to any of the above features in this paragraph, the probabilistic model may comprise a Siamese-BERT (Bidirectional Encoder Representations from Transformers) model. In addition to any of the above features in this paragraph, the sparse representation may be a sparse composite code where each cluster forming part of the composite code has one non-zero representation. In addition to any of the above features in this paragraph, the activation function may be applied using an activation layer in a neural network. In addition to any of the above features in this paragraph, the activation layer may comprise a softmax layer. In addition to any of the above features in this paragraph, the activation layer may comprises a Gum bel-softmax layer. In addition to any of the above features in this paragraph, generating a composite code may be performed using a neural encoder. In addition to any of the above features in this paragraph, information retrieval may be one of text retrieval, image retrieval, and voice retrieval. In addition to any of the above features in this paragraph, the binary representation may comprise a one-hot representation per cluster. In addition to any of the above features in this paragraph, the method may further comprise: generating one or more posting lists from the sparse representation, wherein the posting list associated with a dimension comprises a list of documents having a non-zero binary representation in that dimension in the sparse composite code. In addition to any of the above features in this paragraph, the method may further comprise: regularizing the sparse representation to enforce load-balancing between different dimensions. In addition to any of the above features in this paragraph, regularizing may minimize a loss based on a reconstruction loss combined with an error between an optimal mean activation of the sparse representation and a mean amount of activations of each dimension, weighted by a regularization factor. In addition to any of the above features in this paragraph, regularizing may be unsupervised. In addition to any of the above features in this paragraph, the error may be approximated based on a batch of documents.

According to another aspect, an autoencoder implemented by a processor and a memory may comprise: a neural network encoder configured to receive a dense representation and generate a composite code comprising C clusters of dimension L from the dense representation, and an activation function configured to generate a sparse composite code from the composite code, the sparse composite code comprising a binary representation. In addition to any of the above features in this paragraph, the autoencoder may comprise: a decoder configured to decode the sparse composite code into an original dense representation. In addition to any of the above features in this paragraph, the decoder may comprise a linear decoder. In addition to any of the above features in this paragraph, the activation function may comprise a Gumbel-softmax model. In addition to any of the above features in this paragraph, the encoder may comprise a one-layer encoder. In addition to any of the above features in this paragraph, the autoencoder may further comprise: a neural regularizer configured to regularize the sparse representation to enforce load-balancing between different dimensions. In addition to any of the above features in this paragraph, the autoencoder may further comprise: a batch normalizer configured to reduce variance in the dense representation.

According to another aspect, an information retrieval architecture implemented by one or more processors in combination with a memory comprises: an encoding phase comprising an autoencoder configured to receive a dense representation corresponding to a query, generate a composite code comprising C clusters of dimension L from the dense representation and generate a sparse composite code from the composite code using an activation function, the sparse composite code comprising a binary representation; a scoring phase configured to search an index based on the sparse composite code and output scores for a plurality of documents based on the index; and a sorting phase configured to rank a subset of the plurality of documents based on the scores. In addition to any of the above features in this paragraph, the architecture may further comprise a probabilistic model configured to: receive the query; encode the query into the dense representation; and output the dense representation to the encoding phase. In addition to any of the above features in this paragraph, the probabilistic model may comprise a Transformer model. In addition to any of the above features in this paragraph, the architecture may further comprise: a thresholding phase configured to: receive the scores from the scoring phase; generate a subset of k documents from the scored documents based on a threshold; and output the scores for the subset of k documents to the sorting phase; wherein the sorting phase sorts the top-k documents based on the output scores. In addition to any of the above features in this paragraph, the scoring phase may comprise an Approximate Nearest Neighbor (ANN) search model for information retrieval. In addition to any of the above features in this paragraph, the encoding phase may be implemented using at least one graphics processing unit (GPU) or central processing unit (CPU), and the scoring phase and the sorting phases may be implemented using at least one central processing unit (CPU). In addition to any of the above features in this paragraph, the architecture may be further configured to determine one or more posting lists to score from the sparse composite code, and the scoring phase may search the index based on the determined posting lists. In addition to any of the above features in this paragraph, the scoring phase may be implemented using a plurality of CPUs operating in parallel. In addition to any of the above features in this paragraph, the plurality of CPUs may be divided into at least C threads.

According to another aspect, a method for information retrieval implemented by one or more processors and a memory comprises: receiving a dense representation of a query; generating a composite code comprising C clusters of dimension L from the dense representation; generating a sparse composite code from the composite code model using an activation, the sparse composite code comprising a binary representation; generating scores for a plurality of documents in an index based on the sparse composite code; ranking a subset of the plurality of documents based on the scores; and outputting the ranked subset. In addition to any of the above features in this paragraph, the received dense representation may be generated by a probabilistic model processing the query. In addition to any of the above features in this paragraph, the method may further comprise: receiving the query by the probabilistic model; the probabilistic model encoding the query into the dense representation and outputting the dense representation to an autoencoder for generating the composite code. In addition to any of the above features in this paragraph, the query may comprise a text query and the index may represent one or more of text data, image data and audio data. In addition to any of the above features in this paragraph, the query may comprise one or more of a search query, a request for a recommendation, a question, or a sequence to be translated. In addition to any of the above features in this paragraph, the index may represent documents, and the documents may comprise one or more of text data, image data and audio data. In addition to any of the above features in this paragraph, the scoring may comprise searching the index on the sparse composite code. In addition to any of the above features in this paragraph, the method may further comprise: searching the index based on one or more posting lists determined using the composite code. In addition to any of the above features in this paragraph, the scoring may comprise searching the index on the sparse composite code or one or more posting lists determined using the composite code; wherein the searching is performed by an Approximate Nearest Neighbor (ANN) search model. In addition to any of the above features in this paragraph, the method may further comprise creating the index by: (a) receiving a set of input data, wherein each element of data in the set is a dense representation; (b) generating a composite code from the dense representation, the composite code comprising C clusters of dimension L; (c) using an activation function to generate a sparse representation from the composite code, the sparse representation comprising a binary representation; (d) repeating steps (a)-(c) for each element of data in the set of input data; (e) creating an index based on each of the sparse representations generated at step (c) corresponding to each element of data in the set of input data; and (f) outputting the index for information retrieval.

According to another aspect, an apparatus for transforming one or more dense representations corresponding to one or more documents into a sparse composite code for information retrieval comprises: a non-transitory computer-readable medium having executable instructions stored thereon for causing a processor and a memory to: for each of the one or more dense representations:

receive the dense representation; generate a composite code from the dense representation, the composite code comprising C clusters of dimension L; and use an activation layer to generate the sparse composite code from the composite code, the sparse composite code comprising a binary representation; and outputting the sparse composite codes for the one or more documents for information retrieval. In addition to any of the above features in this paragraph, the processor and memory may be further caused to: generate or supplement an index using the one or more output sparse composite codes. In addition to any of the above features in this paragraph, the processor and memory may be further caused to: search an index using the output sparse composite codes. In addition to any of the above features in this paragraph, the dense representation may be generated from a probabilistic model. In addition to any of the above features in this paragraph, the one or more documents may comprise one or more of text data, image data and audio data.

General

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

All references cited in this application are herein incorporated by reference in their entirety, without an admission that any of such references constitute prior art.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. A method for creating an index for information retrieval, the method being implemented by a processor and memory, the method comprising:
   (a) receiving a set of input data, wherein each element of data in the set is a dense representation;
   (b) generating, using a trained encoder implemented using the processor and including one or more layers, a composite code from the dense representation, the composite code comprising a vector of dimension D decomposed into C clusters of dimension L, where C and L are at least two;
   (c) using an activation function to generate a sparse representation from the composite code, the sparse representation comprising a binary representation comprising C clusters of dimension L, where each cluster sums to one;
   (d) repeating steps (a)-(c) for each element of data in the set of input data;
   (e) creating, using the processor, an index based on each of the sparse representations generated at step (c) corresponding to each element of data in the set of input data; and
   (f) outputting the index for information retrieval.

2. The method of claim 1, wherein each of the dense representations represent one or more of text data, image data and audio data;
   wherein in the composite code of each dense representation data elements are represented by values of each of L subconcepts or classifications for each of C concepts.

3. The method of claim 1, wherein each of the dense representations represent text data and the dense representation is generated using a probabilistic model; wherein the probabilistic model comprises a Transformer model.

4. The method of claim 1, wherein the sparse representation is a sparse composite code where each of the C clusters forming part of the composite code has exactly one non-zero binary representation.

5. The method of claim 1, wherein the activation function is applied using an activation layer in a neural network.

6. The method of claim 5, wherein the activation layer comprises a softmax layer.

7. The method of claim 1, wherein information retrieval is one of text retrieval, image retrieval, and voice retrieval.

8. The method of claim 1, further comprising:
   generating one or more posting lists from the sparse representation, wherein the posting list associated with a dimension comprises a list of documents having a non-zero binary representation in that dimension in the sparse composite code.

9. A method for creating an index for information retrieval, the method being implemented by a processor and memory, the method comprising:
   (a) receiving a set of input data, wherein each element of data in the set is a dense representation;
   (b) generating, using a trained encoder implemented using the processor and including one or more layers, a composite code from the dense representation, the composite code comprising a vector of dimension D decomposed into C clusters of dimension L, where C and L are at least two;

(c) using an activation function to generate a sparse binary representation from the composite code, the sparse representation comprising C clusters of dimension L;

(d) repeating steps (a)-(c) for each element of data in the set of input data;

(e) creating, using the processor, an index based on each of the sparse representations generated at step (c) corresponding to each element of data in the set of input data; and (f) outputting the index for information retrieval;

wherein the method further comprises:

regularizing the sparse binary representation to enforce load-balancing between different dimensions.

10. The method of claim 9, wherein said regularizing minimizes a loss based on a reconstruction loss combined with an error between an optimal mean activation of the sparse representation and a mean amount of activations of each dimension, weighted by a regularization factor;

wherein said regularizing is unsupervised.

11. The method of claim 10, wherein the error is approximated based on a batch of documents.

12. An autoencoder for information retrieval implemented by a processor and a memory comprising:

a neural network encoder implemented using the processor, the neural network encoder being trained to receive a dense representation and generate a composite code comprising a vector of dimension D decomposed into C clusters of dimension L from the dense representation, where C and L are at least two, and an activation function implemented using the processor, the activation function being configured to generate a sparse composite code from the composite code, the sparse composite code comprising a binary representation comprising C clusters of dimension L, where each cluster sums to one;

wherein the sparse composite code is used to generate, supplement, or search an index for information retrieval.

13. The autoencoder of claim 12 further comprising:

a decoder implemented using the processor and configured to decode the sparse composite code into an original dense representation during training of the neural network encoder.

14. The autoencoder of claim 12, wherein the decoder comprises a linear decoder.

15. The autoencoder of claim 12, wherein the activation function comprises a Gumbel-softmax model.

16. The autoencoder of claim 12, wherein the encoder comprises a one-layer encoder.

17. The autoencoder of claim 12, further comprising:

a batch normalizer implemented using the processor and configured to reduce variance in the dense representation.

18. An autoencoder for information retrieval implemented by a processor and a memory comprising:

a neural network encoder implemented using the processor, the neural network encoder being trained to receive a dense representation and generate a composite code from the dense representation, the composite code comprising a vector of dimension D decomposed into C clusters of dimension L, where C and L are at least two, and an activation function implemented using the processor, the activation function being configured to generate a sparse composite code from the composite code, the sparse representation being a binary representation comprising C clusters of dimension L;

wherein the sparse composite code is used to generate, supplement, or search an index for information retrieval;

further comprising:

a neural regularizer implemented using the processor and configured to regularize the sparse representation to enforce load-balancing between different dimensions;

wherein in the composite code of each dense representation data elements are represented by values of each of Z subconcepts or classifications for each of C concepts.

19. An information retrieval architecture implemented by one or more processors in combination with a memory, the architecture comprising:

an encoding phase implemented using the one or more processors and having one or more layers, the encoding phase being trained to receive a dense representation corresponding to a query, generate a composite code comprising a vector of dimension D decomposed into C clusters of dimension L from the dense representation and generate a sparse composite code from the composite code using an activation function, the sparse composite code comprising a binary representation comprising C clusters of dimension L, where each cluster sums to one, where C and L are at least two;

a scoring phase implemented using the one or more processors and configured to search an index based on the sparse composite code and output scores for a plurality of documents based on the index; and a sorting phase implemented using the one or more processors and configured to rank a subset of the plurality of documents based on the scores and output one or more relevant documents from the ranked subset.

20. The architecture of claim 19, further comprising a probabilistic model implemented using the one or more processors and configured to:

receive the query;

encode the query into the dense representation; and output the dense representation to the encoding phase.

21. The architecture of claim 19, further comprising:

a thresholding phase implemented using the one or more processors and configured to:

receive the scores from the scoring phase;

generate a subset of k documents from the scored documents based on a threshold; and output the scores for the subset of k documents to the sorting phase;

wherein the sorting phase sorts the top-k documents based on the output scores.

22. The architecture of claim 19, wherein the scoring phase comprises an Approximate Nearest Neighbor (ANN) search model for information retrieval.

23. The architecture of claim 19, wherein the one or more processors of the encoding phase comprise at least one graphics processing unit (GPU) or central processing unit (CPU), and wherein the one or more processors of the scoring phase comprise at least one central processing unit (CPU).

24. The architecture of claim 19, wherein the architecture is further configured to determine one or more posting lists to score from the sparse composite code, and wherein the scoring phase searches the index based on the determined posting lists.

25. The architecture of claim 19, wherein the one or more processors scoring phase comprises a plurality of CPUs operating in parallel.

26. A method for information retrieval implemented by one or more processors and a memory, the method comprising:

receiving a dense representation of a query;

generating, using a trained encoder implemented using the one or more processors and including one or more layers, a composite code comprising a vector of dimension D decomposed into C clusters of dimension L from the dense representation, where C and L are at least two;

generating a sparse composite code from the composite code model using an activation implemented using the one or more processors, the sparse composite code comprising a binary representation comprising C clusters of dimension L, where each cluster sums to one;

generating scores for a plurality of documents in an index based on the sparse composite code;

ranking a subset of the plurality of documents based on the scores; and outputting the ranked subset.

27. The method of claim 26, wherein the received dense representation is generated by a probabilistic model processing the query.

28. The method of claim 26, wherein the query comprises a text query and the index represents one or more of text data, image data and audio data;

wherein in the composite code of each dense representation data elements are represented by values of each of L subconcepts or classifications for each of C concepts.

29. The method of claim 26, wherein the query comprises one or more of a search query, a request for a recommendation, a question, or a sequence to be translated.

30. The method of claim 26, wherein the index represents documents, and wherein the documents comprise one or more of text data, image data and audio data;

wherein in the composite code of each dense representation data elements are represented by values of each of L subconcepts or classifications for each of C concepts.

31. The method of claim 26, wherein the scoring comprises searching the index on the sparse composite code.

32. The method of claim 26, wherein the scoring comprises searching the index based on one or more posting lists determined using the composite code.

33. The method of claim 26, further comprising, creating the index by:

(a) receiving a set of input data, wherein each element of data in the set is a dense representation;

(b) generating a composite code from the dense representation using the trained encoder, the composite code comprising a vector of dimension D decomposed into C clusters of dimension L, where C and L are at least two;

(c) using an activation function implemented using the one or more processors to generate a sparse representation from the composite code, the sparse representation comprising a binary representation comprising C clusters of dimension L, where each cluster sums to one;

(d) repeating steps (a)-(c) for each element of data in the set of input data;

(e) creating an index based on each of the sparse representations generated at step (c) corresponding to each element of data in the set of input data; and (f) outputting the index for information retrieval.

34. An apparatus for transforming one or more dense representations corresponding to one or more documents into a sparse composite code for information retrieval comprising:

a non-transitory computer-readable medium having executable instructions stored thereon for causing a processor and a memory to:

for each of the one or more dense representations:

receive the dense representation;

generate, using a trained encoder including one or more layers, a composite code from the dense representation, the composite code comprising a vector of dimension D decomposed into C clusters of dimension L, where C and L are at least two; and use an activation layer to generate the sparse composite code from the composite code, the sparse composite code comprising a binary representation comprising C clusters of dimension L, where each cluster sums to one; and outputting the sparse composite codes for the one or more documents for generating, supplementing, or searching an index for information retrieval.

35. The apparatus of claim 34, wherein the processor and memory is further caused to:

generate or supplement an index using the one or more output sparse composite codes.

36. The apparatus of claim 34, wherein the processor and memory is further caused to:

search an index using the output sparse composite codes.

37. The apparatus of claim 34, wherein the dense representation is generated from a probabilistic model.

38. The apparatus of claim 34, wherein the one or more documents comprise one or more of text data, image data and audio data;

wherein in the composite code of each dense representation data elements are represented by values of each of L subconcepts or classifications for each of C concepts.

39. The apparatus of claim 34, wherein the executable instructions further cause a processor and a memory to:

regularize the sparse composite code to enforce load-balancing between different dimensions.

* * * * *